(12) United States Patent
Blomgren et al.

(10) Patent No.: US 10,060,320 B2
(45) Date of Patent: Aug. 28, 2018

(54) SYSTEM AND METHOD FOR DETERMINING A PARAMETER INDICATIVE OF AN AMOUNT OF A REDUCING AGENT

(71) Applicant: VOLVO TRUCK CORPORATION, Göteborg (SE)

(72) Inventors: Fredrik Blomgren, Göteborg (SE); Johan Dahl, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 121 days.

(21) Appl. No.: 15/106,193

(22) PCT Filed: Dec. 19, 2013

(86) PCT No.: PCT/EP2013/003858
§ 371 (c)(1),
(2) Date: Jun. 17, 2016

(87) PCT Pub. No.: WO2015/090342
PCT Pub. Date: Jun. 25, 2015

(65) Prior Publication Data
US 2016/0333760 A1 Nov. 17, 2016

(51) Int. Cl.
*F01N 3/20* (2006.01)
*F01N 11/00* (2006.01)

(52) U.S. Cl.
CPC ........... *F01N 3/208* (2013.01); *F01N 3/2066* (2013.01); *F01N 11/00* (2013.01);
(Continued)

(58) Field of Classification Search
CPC ........ F01N 11/00; F01N 3/2066; F01N 3/208; F01N 2330/06; F01N 2560/021;
(Continued)

(56) References Cited

U.S. PATENT DOCUMENTS 4,954,837 A * 9/1990 Baird .................. G01C 21/005
342/458
2008/0143345 A1 6/2008 Boudaoud et al.
(Continued)

FOREIGN PATENT DOCUMENTS

CN 101680378 A 3/2010
CN 101782011 A 7/2010
(Continued)

OTHER PUBLICATIONS

International Search Report (dated Apr. 11, 2014) for corresponding International App. PCT/EP2013/003858.
(Continued)

*Primary Examiner* — Brandon Lee
(74) *Attorney, Agent, or Firm* — WRB-IP LLP

(57) ABSTRACT

A system is provided for determining a parameter indicative of an amount of a reducing agent in a selective catalytic reduction (SCR) module of a vehicle, the system including: the SCR module having at least one passage for transporting a stream of gas and an SCR catalyst for converting NOx emissions, and having an extension in an axial direction, at least one first antenna unit configured to transmit and receive a microwave signal. Moreover, the first antenna unit is arranged outside the SCR module and configured to transmit microwave signals towards the SCR catalyst and to receive a microwave signal reflected within the SCR module. The system further includes processing circuitry connected to the first antenna unit and configured to determine a difference between the transmitted microwave signal and the received reflected microwave signal and to determine a parameter indicative of the amount of a reducing agent in the SCR catalyst based on the determined difference between the transmitted microwave signal and the received reflected microwave signal. Moreover, the invention relates to a
(Continued)

method for determining a parameter indicative of an amount of a reducing agent in a system of a vehicle.

30 Claims, 8 Drawing Sheets

(52) U.S. Cl.
CPC .... *F01N 2330/06* (2013.01); *F01N 2560/021* (2013.01); *F01N 2560/12* (2013.01); *F01N 2560/14* (2013.01); *F01N 2590/08* (2013.01); *F01N 2610/02* (2013.01); *F01N 2900/1818* (2013.01); *Y02T 10/24* (2013.01); *Y02T 10/47* (2013.01)

(58) Field of Classification Search
CPC ............. F01N 2560/12; F01N 2560/14; F01N 2590/08; F01N 2610/02; F01N 2900/1818; Y02T 10/24; Y02T 10/47
See application file for complete search history.

(56) References Cited

U.S. PATENT DOCUMENTS

| | | | | |
|---|---|---|---|---|
| 2010/0126151 | A1* | 5/2010 | Andersson | ............ F01N 3/0231 60/297 |
| 2014/0283503 | A1* | 9/2014 | Roesch | ................. G01N 22/00 60/274 |

FOREIGN PATENT DOCUMENTS

| | | |
|---|---|---|
| DE | 102010034983 A1 | 2/2012 |
| WO | 2013010897 A1 | 1/2013 |

OTHER PUBLICATIONS

Chinese Official Action (May 2, 2018) for corresponding Chinese App. 201380081814.6.
CN101680378A (Mar. 24, 2010) Schrader Electronics Ltd—English language abstract (corresponds to US20080143345A1 (Jun. 19, 2008).

\* cited by examiner

SYSTEM AND METHOD FOR DETERMINING A PARAMETER INDICATIVE OF AN AMOUNT OF A REDUCING AGENT

BACKGROUND AND SUMMARY

The invention relates to a system for determining a parameter indicative of an amount of a reducing agent in a selective catalytic reduction (SCR) module of a vehicle. The system comprises a first antenna unit configured to transmit and receive a microwave signal. The invention also relates to an exhaust aftertreatment system for receiving an exhaust gas, comprising a system for determining a parameter indicative of an amount of a reducing agent in a selective catalytic reduction module of a vehicle. Furthermore, the invention relates to an internal combustion engine producing an exhaust gas, and including an exhaust aftertreatment system.

Moreover, the invention relates to a vehicle comprising an exhaust aftertreatment system.

In addition, the invention relates to a method for determining a parameter indicative of an amount of a reducing agent in a system of a vehicle.

The invention can be applied in heavy-duty vehicles, such as trucks, buses and construction equipment. Although the invention will be described in relation to a truck, the invention is not restricted to this particular vehicle, but may also be used in other type of vehicles such as cars, industrial construction machines, wheel loaders, etc.

Engines, in particular diesel-powered combustion engines but also other engines known in the art, produce exhaust gases which contain several air pollutants, including carbon monoxide (CO), hydrocarbons (HC), nitrogen oxides NO and N02 (NOx) as well as particulate matter (PM) containing carbonaceous matter, or soot.

However, current regulatory conditions in the automotive market have led to an increasing demand to improve fuel economy and reduce emissions in present vehicles. Further, with increased attention to environmental problems and health hazard prevention, exhaust emission regulations are becoming more and more stringent. These regulatory conditions must be balanced with the demands of a consumer for high performance and quick response for a vehicle.

Accordingly, reducing the oxides of nitrogen (NO and N02, referred to as NOx) and particulate matter (PM) in exhaust gases from a diesel engine has become a very important problem in view of the protection of environment and the saving of finite fossil energy supply. Vehicles equipped with diesel or other lean burn engines offer the benefit of increased fuel economy, however, catalytic reduction of NOx emissions via conventional means in such systems is difficult due to the high content of oxygen in the exhaust gas.

To reduce the amount of NOx in the exhaust gases, some engines are equipped with Selective Catalytic Reduction (SCR) systems that convert a mixture of NOx and ammonia (NH3) into nitrogen gas (N2) and water (H20). For example, US 2008/0060348 A1 disclose an exhaust aftertreatment system for reducing NOx comprising a first SCR catalyst, a second SCR catalyst, and a particulate filter positioned between said first and second SCR catalyst.

This type of system is based on the principle that NOx is continuously removed through active injection of a reductant into the exhaust gas mixture entering the SCR catalyst in order to achieve high NOx conversion efficiency. Urea-based SCR catalyst systems use gaseous ammonia as the active NOx reducing reductant.

Typically, an aqueous solution of urea is carried on board of a vehicle, and an injection system is used to supply it into the exhaust gas stream entering the SCR catalyst system where it decomposes into hydro cyanic acid (NHCO) and gaseous ammonia (NH3), which is then used to convert NOx.

However, in such systems, urea injection levels have to be very precisely controlled. Under-injection of urea may result in sub-optimal NOx conversion, while over-injection may cause tailpipe ammonia slip. Ammonia slip is an industry term for ammonia passing through the SCR system unreacted.

The NOx conversion efficiency of a SCR catalyst system can normally be continuously derived during operation of the vehicle, for example by means of at least one NOx sensor arranged downstream of a SCR catalyst.

However, a conventional SCR catalyst system often requires, if not always, calibration or tuning to perform in an efficient and reliable manner. Part of tuning involves ensuring a proper distribution of ammonia in the gas stream and uniform gas velocity through the SCR catalyst. Without tuning, the SCR catalyst systems can exhibit inefficient NOx reduction along with excessive ammonia slip due to not utilizing the SCR catalyst surface area effectively. Another facet of tuning involves determining the proper ammonia flow for all process conditions. Ammonia flow is in general controlled based on NOx measurements taken from the gas stream or predetermined performance curves from the engine manufacturer. Unfortunately, controlling the ammonia flow based on pre-determined performance curves is highly complicated since nearly all future operating conditions must be known beforehand to properly design, calibrate and tune the SCR catalyst system. In addition, the SCR process requires precise control of the ammonia injection rate. Nevertheless, controlling the SCR catalyst system by monitoring the amount of NH3 is central to minimize emissions.

An insufficient injection of NH3 may result in unacceptably low NOx conversions, i.e. when the amount of NH3 is too small, the NOx-emissions will steadily increase. An injection rate which is too high results in release of undesirable ammonia to the atmosphere, i.e. when the amount of NH3 is too large, both the N20-production in the SCR system and the ammonia slip in to the ammonia slip catalysts (ASC) will increase. Ammonia slip catalysts (ASC) are being used downstream of an SCR system to minimize the ammonia slip. Thus, an increase in the ammonia-slip in to the ammonia slip catalysts (ASC) typically increases the N20 and NO production.

As mentioned above, ammonia slip may happen when ammonia is over-injected into the exhaust gas stream, if the temperatures are too low for ammonia to react or if the SCR catalyst has degraded. In fact, temperature might be one of the largest limitations of SCR systems, in particular since diesel engines have a period during a start-up where exhaust temperatures are too cool for NOx reduction to occur. Typically, the ammonia slip decreases with increasing temperature, while the NOx conversion in an SCR system may either increase or decrease with temperature, depending on the particular temperature range and catalyst system.

At least for these reasons, it is considered essential to control the amount of NH3 in order to better meet prevailing and future legislation conditions.

Several attempts to achieve this have been carried out. In WO 2013/010897 A, for example, a measurement system is disclosed using microwave for measuring the NH3-loading state of an SCR catalyst. In this system, measurements are carried out for determining the electrical properties of the SCR catalyst and serve as a calibration value for the measurement system when the loading state cannot be determined. In one example, the system includes at least one antenna. In another example, the system is provided with a set of two antennas, one antenna being arranged in front of the SCR catalyst and one antenna being arranged after the SCR catalyst. The aim is to measure the total amount of stored gaseous species in the SCR system. This information is used to control or diagnose the state of the catalyst, e.g. ageing, damage etc.

However, controlling the NH3-amount, i.e. the amount of a reducing agent, in an SCR system is a troublesome operation, and often involves complicated calibration processes due to noise, imprecise application and other difficulties relating to diagnosing and controlling the SCR system. Hence, there is a need in the art for a more efficient system for controlling the SCR system and determining the amount of a reducing agent, e.g. the amount of NH3, in the system.

Another problem with current exhaust aftertreatment systems is the physical size of the system and the limited space available in modern vehicles, rendering packaging of the exhaust aftertreatment system difficult.

It would be beneficial if it could be ensured that the system for determining the amount of a reducing agent in an SCR system can be installed in a known or commercially-available vehicle without substantial changes to the exhaust aftertreatment system of said vehicle.

It is desirable to provide an improved and reliable system for determining an amount of a reducing agent, e.g. an NH3-amount, in a selective catalytic reduction (SCR) module which is capable of measuring the amount of stored NH3-amount at a given axial distance of the SCR module.

According to a first aspect of the present invention there is provided a system for determining a parameter indicative of an amount of a reducing agent in a selective catalytic reduction (SCR) module of a vehicle, the system comprising:

the SCR module having at least one passage for transporting a stream of gas and an SCR catalyst for converting NOx emissions, and having an extension in an axial direction A, a first antenna unit configured to transmit microwave signal ST and receive a microwave signal SR, Moreover, the first antenna unit is arranged outside the SCR module and configured to transmit microwave signals ST towards the SCR catalyst and to receive a microwave signal SRef, R reflected within the SCR module.

In addition, the system comprises:

processing circuitry connected to the first antenna unit and configured to determine a first difference d between the transmitted microwave signal ST and the received reflected microwave signal SRef, R and to determine a parameter indicative of the NH3-amount in the SCR catalyst based on the determined first difference d between the transmitted microwave signal ST and the received reflected microwave signal SRefi R.

Typically, the reducing agent may be at least one of anhydrous ammonia, aqueous ammonia or urea. Typically, the amount of the reducing agent may correlate to an amount of NH3. Accordingly, the amount of reducing agent may hereinafter and throughout the description be referred to as the amount of NH3.

By the principle of the present invention, it becomes possible to provide a system which is capable of determining a parameter indicative of the NH3-amount in the SCR catalyst at a given axial distance X. Accordingly, the present invention allows for a determination of the distribution of the NH3-amount. In addition, the present invention contributes to a more precise measurement of the NH3-amount, hereinafter sometimes also called NH3 loading buffer, in the SCR module and better urea injection control. Typically, the configuration of the processing circuitry may include radio frequency (RF) spectral analysis in order to determine the difference between the transmitted microwave signal ST and the received reflected microwave signal SRef, R. In addition, or alternatively, the configuration of the processing circuitry may include radio frequency (RF) spectral analysis in order to determine the difference between the transmitted microwave signal ST and the received microwave signal SRef, R.

Advantages of the system according to the present invention, will be described in more detail throughout the application text, and are also summarized below:

The system may allow for continuously measuring the distribution of the NH3-amount of the SCR module. Through continuous measurement of the NH3-amount within the SCR module, the SCR model can be constantly updated and improved. Thereby, it will be possible not only to control the buffer size (as is done currently) but also the distribution.

The system may allow for higher NOx-conversion through higher usage of the SCR process of the SCR module.

The system may allow for a reduction of SCR volume of the SCR module. The system may contribute to reduce ammonia-slip, or even result in that ammonia-slip can be avoided.

The system may contribute to reduce N20 or NO-production in the ASC. The system may allow for better utilization of the urea. In this manner, it becomes possible to reduce the waste of urea in an exhaust aftertreatment system.

The system may even result in that the ASC becomes redundant in an exhaust aftertreatment system.

The system may allow for continuously measuring the state of the SCR module, including the state of the SCR catalyst. In this manner, it becomes possible to consider the available maximum ammonia storage capacity.

The system may allow for achieving a compensation for SCR deactivation. The system may further improve the robustness relating to NOx-conversion efficiency malfunction with respect to the injector or diluted urea. For instance, the present invention allows for detection of and distinguishing between: Urea dosing malfunction, SCR malfunction and ageing.

In view of prior art systems, either including an antenna arranged within the SCR module, or an antenna arranged in the front, or after, the SCR module and in the stream of exhaust gas, as seen in the axial direction, the present invention has the following advantages:

The system may allow measurement of coverage also at high NH3 flows whereas current NH3 sensors based on lambda sensor technology are limited.

The system may be easier to install and build (assuming that it can withstand higher temperatures).

The system may be easier to replace at workshops as it is located outside the SCR module.

The system may provide improved accuracy as it measures through the entire cross sectional area of the SCR module.

The system may reduce flow disturbance both within and outside the SCR module.

There are a number of underlying reasons behind these technical effects, which will be described in further detail below.

The present invention is based on the insight that one difficulty of controlling the NH3-amount is the difference in time constant between the system out (SO) NOx and ammonia transport dynamics. Changing the engine out (EO) NOx flow entails by and large an immediate response in SO NOx. With perfectly functioning NOx sensors, this dynamics can be measured and controlled accordingly. However, the same is not true for the NH3-amount due to the fact that ammonia is transported in the axial direction A through a combination of reaction, adsorption and desorption. One analogy is to consider the ammonia transport from inlet towards outlet as a slowly tumbling avalanche. For example, if for some reason a "hole" in the buffer distribution has arisen, that hole will remain and slowly be transported towards the outlet and a portion of the SCR process is not used. If for some reason a "bump" has arisen, it will also be slowly transported towards the outlet and perhaps entail ammonia slip and/or N20-production in the ASC. Furthermore, in the meantime as the buffer distribution changes, the driver's actions (which affect for instance mass flow, temperature and NOx-flow) come into play and also affect the buffer. In this context, it is to be noted that due to the inertia of the buffer, the axial buffer distribution cannot be detected by conventional sensors. Sensor may, at best, only give an estimate of the mean buffer size.

One common problem with prior art systems is that the buffer is predicted erroneously. Furthermore, currently the ageing state of the SCR is not considered, which means that the maximum ammonia storage capacity is not considered.

In addition, only the total buffer size is controlled, not the distribution. An evenly distributed buffer in the axial direction can handle both high and low mass flows, whereas an unevenly distributed buffer can only handle low mass flows which results in unnecessary emissions. Furthermore, an evenly distributed buffer means that the whole SCR module length is utilized, as opposed to the current situation, which means that that SCR module can be made smaller and cheaper.

One important parameter which affects the buffer is the urea dosing.

Currently, there is no way of detecting either urea injector malfunction (over- or underinjection) or urea quality issues (e.g. dilution).

The ageing state of the SCR is also an important parameter as the total buffer capacity (i.e. the total amount of ammonia that can be stored) is decreased with increased ageing. However, ageing is not simply a function of driven distance as the temperature history is also of great importance. Hence, if the ageing state is unknown there is always a risk of overinjection of urea (increased fuel cost, N20 and NH3 emissions) or underinjection (increased NOx emissions). By measurement of the buffer at for instance every parked regeneration (which entails steady state temperature and flow), the ageing state can be continuously monitored.

In view of the aforesaid, the present invention provides a system that is capable of determining a parameter indicative of the NH3-amount in the SCR catalyst allowing for a determination of the ammonia coverage at a given distance from the inlet (i.e. front of the SCR module) so as to better deal with problems and parameters, as mentioned above. In other words, by the present invention, it becomes possible to determine the distribution of the NH3-amount in the SCR catalyst.

Without departing from the scope of the present invention, it is to be noted that the SCR module may herein sometimes refer to as the catalytic stone including the catalytic material and/or the SCR system including the SCR catalyst.

By the provision that the first antenna unit is arranged outside the SCR module and configured to transmit microwave signals ST towards the SCR catalyst and to receive a microwave signal SR reflected within the SCR module, it becomes possible to provide a non-invasive system utilizing microwaves for determining a parameter indicative of the NH3-amount in the SCR module. Accordingly, the above provision means that the antenna unit is arranged outside the stream of exhaust gas. In other words, the antenna is arranged outside of the SCR module and consequently outside the stream of exhaust gas, as opposed to inside the SCR module and in the stream of exhaust gas.

The "parameter" may for instance relate to the concentration of NH3. This type of parameter may refer either to an absolute concentration value, such as mol/dm3 or g/ml, etc., or to relative concentration representations. Thus, determining a parameter indicative of the NH3-amount may also involve a comparison between a determined concentration in the SCR module including the SCR catalyst and a reference value or a previous determined concentration. The parameter may also refer to a detection of NH3-molecules in the SCR module including the SCR catalyst. In addition, or alternatively, the parameter may simply refer to the NH3-amount.

In the context of the present invention, it is to be noted that the "difference" or "first difference" may refer to a difference in microwave spectrum signal between the transmitted microwave signal ST and the received reflected microwave signal SRef, R.

Typically, these signals are transmitted and received from one and the same antenna unit (i.e. first antenna unit). Analogously, if more than one antenna is installed, the "second difference", "third difference" etc. may refer to a difference in microwave spectrum signal between the transmitted microwave signal ST from a first antenna unit and a received microwave signal SR2 received by a second (or third) antenna unit. By using a processing circuitry, any one of these differences can be translated to the degree of NH3-coverage, i.e. the amount of NH3, e.g. by a predetermined algorithm. Accordingly, it becomes possible to determine a parameter indicative of the NH3-amount in the SCR catalyst based on the determined difference between the transmitted microwave signal and the received microwave signal.

The signal transmitted from an antenna unit is typically within a bandwidth having a predetermined radio frequency. Alternatively, a plurality of signals may be transmitted by the antenna unit having different predetermined frequencies. By knowing the radio frequency of the transmitted signal, it becomes possible to determine a difference between the transmitted signal and the received reflected signal, or the received signal. This analysis is typically carried out by the processing circuitry.

The "difference" may correspond to a difference in pulse, a difference in amplitude and/or a difference in spectrum energy. Alternatively, the difference may correspond to a difference in attenuation. More specifically, the "difference" may refer to a difference between the magnitude of the amplitude of the transmitted microwave and the magnitude of the amplitude of the received reflected microwave. Analogously, the "difference" may refer to a difference between the magnitude of the amplitude of the transmitted microwave and the magnitude of the amplitude of the received microwave. Analogously, the "difference" may refer to a difference between the pulse of the transmitted microwave and the pulse of the received reflected microwave, or the received microwave. For instance, a predetermined point, such as a valley or peak, of a pulse of the transmitted signal is compared with the location of the predetermined point of a pulse of the received reflected signal. Analogously, a predetermined point, such as a valley or peak, of a pulse of the transmitted signal is compared with the location of the predetermined point of a pulse of the received signal. That is, the change in pulse is determined between the transmitted signal and the received reflected signal, or received signal.

Accordingly, the present invention is based on the principle that by analyzing the amplitude, attenuation and/or phase changes at a given frequency or preferably at multiple frequencies, it becomes possible to determine a difference between the received microwave and the transmitted microwave.

Without being bound by any theory, the present invention is realised by the fact that there is an electric field distribution within the SCR module including the SCR catalyst due to the charge separated nature of the metal and surrounding environment (hereforth called M-S). Hence, there is an electric field distribution which gives M-S certain dielectric properties. These dielectric properties can be detected by microwave radar and give rise to a microwave signal spectrum. In other words, when an NH3-molecule is adsorbed on the surface of the SCR catalyst, it is bonded to a metal atom forming the complex NH3-M-S. When the chemical bond between the NH3-molecule and the metal atom has formed, the electric field will change. That is, the M-S—NH3 complex (after NH3 adsorption) will display a different electric field from the M-S complex (before NH3 adsorption). Hence, the microwave signal spectrum will also be different when an NH3 molecule is attached. Accordingly, by measuring and determining a difference between the transmitted microwave signal and the received microwave signal, it becomes possible to detect this change of the dielectric property of the SCR catalyst.

Accordingly, it should be readily appreciated that the provision "amount of a reducing agent in a selective catalytic reduction (SCR) module" may herein refer to an amount of the reducing agent bound to the SCR catalyst as a consequence of the above principle. In one example, the reducing agent is adsorbed onto the SCR catalyst. However, other chemical reactions are conceivable within the term amount of a reducing agent in a selective catalytic reduction (SCR) module or amount of the reducing agent bound to the SCR catalyst.

Hence, the provision "determining a parameter indicative of an amount of a reducing agent in a selective catalytic reduction (SCR) module" may herein refer to determining a parameter indicative of an amount of a reducing agent bound to a SCR catalyst of a selective catalytic reduction (SCR) module.

In one example embodiment, the processing circuitry may be configured to perform a spectrum analysis of the received signal to detect a difference between the received signal and the transmitted signal. The antenna unit can be a frequency tunable signal source that sweeps the frequency of the microwave signal to obtain multiple radio frequency signals of different frequencies in the predetermined RF range. Further, the processing circuitry is configured to analyze the amplitude and/or phase at the different frequencies of the multiple RF signals to estimate the difference.

When injecting a reducing agent, for instance a fluid ammonia-containing reductant, such as urea, the decomposition reaction of said reductant to active reagent gaseous ammonia within the exhaust passage requires a certain temperature level of the exhaust gases at the injection position for substantially complete decomposition, e.g. normally around 200 degrees C. Hence, during operation of the system, the SCR module may typically further contain the reducing agent, e.g. NH3-molecules. In other words, the SCR catalyst reacts with ammonia for the catalytic removal of NOx emissions in the exhaust gases.

It should therefore be readily appreciated that the SCR module, during operation of the system, is adapted to receive a reducing agent, as mentioned above. The reducing agent may typically be supplied by an injector.

Moreover, the inventive arrangement as a consequence results in improved NOx emissions control due to better control of the state of the SCR module and the SCR catalyst.

Microwaves are a form of electromagnetic radiation with wavelengths ranging from as long as one meter to as short as one millimeter, or equivalently, with frequencies between 300 MHz (0.3 GHz) and 300 GHz. Radio frequency (RF) is a rate of oscillation in the range of about 3 kHz to 300 GHz.

The term "processing circuitry" may refer to a control unit and/or may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital, signal processor mentioned above, the processor may further include computer executable code that controls operation of the programmable device.

Typically, the processing circuitry may determine the difference based on a spectral analysis of the received RF signal by analyzing the amplitude and/or phase at different frequencies. By detecting changes in the amplitude and/or phase at selected frequencies, the processing circuitry is capable to compare the transmitted signal with the received signal. In the case of a sweeping frequency signal, the processing circuitry can utilize all or a portion of the frequencies in the swept range for the purpose of performing the signal analysis. In the case of a composite RF signal with larger bandwidth, the processing circuitry may be connected to a set of one or more filters, such as bandpass filters, for filtering out interesting portions of the received composite RF signal and use these frequency portions in the spectrum analysis.

The difference can be determined based on a comparison of a current spectrum value (amplitude/phase at one or more frequencies or ratio of amplitude/phase at multiple frequencies) of the received signal and a previously determined spectrum value of the transmitted signal. The previously determined spectrum value of the transmitted signal can be based on a spectrum analysis at a previous time instance.

The system can be utilized to determine the state of the SCR module and the

SCR catalyst. The state may here refer to the ageing state of the SCR module. As an example, the system may be configured to diagnose the SCR module and the SCR catalyst based on the determined parameter indicative of the NH3-amount. For instance, assuming that the SCR has been sulphur regenerated and that the ageing state is known, each of the following malfunctions can be diagnosed by the determined parameter indicative of the NH3-amount:

At the end of a parked regeneration when the system has cooled to a reasonable temperature, a little more than stoichiometric urea is injected. By knowing the ageing and that the system is not sulphur poisoned, the ammonia coverage at various lengths, as seen in the axial direction of the SCR module can be calculated and compared to the measurement. If the difference is above a tolerance limit, the OBD system can diagnose the urea dosing system as malfunctioning.

By continuous measurement of the ageing state, SCR malfunction (leakage, cracks etc.) is distinguished from deactivation processes as an abrupt change in NOx conversion and NH3 storage.

As will be further described hereinafter, the invention can be installed and used in any type of vehicle such as e.g. heavy-duty vehicles, such as trucks, buses and construction equipment.

In one example embodiment, there is provided a system for determining a parameter indicative of an NH3-amount in a selective catalytic reduction (SCR) module of a vehicle, the system comprising:

the SCR module having at least one passage for transporting a stream of gas and an SCR catalyst for converting NOx emissions, and having an extension in an axial direction A, at least a first antenna unit configured to transmit microwave signal ST and receive a microwave signal SR, Moreover, the first antenna unit is arranged outside the SCR module and configured to transmit microwave signals ST towards the SCR catalyst and to receive a microwave signal SRef, R reflected within the SCR module.

In addition, the system comprises:

processing circuitry connected to the first antenna unit and configured to determine a first difference d between the transmitted microwave signal ST and the received reflected microwave signal SRef, R and to determine a parameter indicative of the NH3-amount in the SCR catalyst based on the determined first difference d between the transmitted microwave signal ST and the received reflected microwave signal SRef, R.

Typically, the reducing agent may comprise at least one of anhydrous ammonia, aqueous ammonia or urea, or a mixture thereof.

Further advantages are achieved by implementing one or several of the features of the dependent claims.

By the principle that the first antenna unit is arranged outside the SCR module and configured to transmit microwave signals ST towards the SCR catalyst, the first antenna unit typically is configured to transmit microwave signals across a cross sectional area TA of the SCR module.

Hence, according to an example embodiment the first antenna unit may be configured to transmit microwave signals across a cross sectional area TA of the SCR module. Typically, the microwave signals are transmitted across a cross sectional area, which is substantially perpendicularly orientated to the axial direction A. If the SCR module is provided in the form of a cylindrical shaped module, the cross sectional area TR is a radial cross sectional area of the SCR module. The radial cross sectional area of the SCR module is typically perpendicular to the axial direction A, or at least substantially perpendicular to the axial direction A.

It is also conceivable that the SCR module can be provided in another a three-dimensional geometric shape, such as cube etc. Hence, the cross sectional area TR may also correspond to other shapes such as a square, rectangle etc.

According to an example embodiment, the SCR module may be configured to direct the gas stream in parallel with the axial direction A and that the antenna unit may be positioned within a distance in the axial direction A limited by end portions of the SCR module in the axial direction A. In other words, the antenna unit is not positioned in the front of the SCR module and/or after the SCR module, as seen in the axial direction A. Neither is the antenna unit positioned in the exhaust gas channel (passage). It should be noted that the above configuration of the first antenna unit is also applicable to any one of the antenna units mentioned herein.

According to an example embodiment, the system may further comprise—a second antenna unit configured to receive the transmitted microwave signal ST from the first antenna unit, and connected to the processing circuitry, wherein the second antenna unit is arranged outside the SCR module and spaced apart from the first antenna unit, the processing circuitry is configured to determine the first difference d between the transmitted microwave signal ST from the first antenna unit and the received reflected microwave signal SRef, R received by the first antenna unit and/or a second difference d2 between the transmitted microwave signal ST from the first antenna unit and a received microwave signal SR2 received by the second antenna unit to determine a parameter indicative of an amount of a reducing agent (e.g. the amount of NH3) in the SCR catalyst based on the determined difference d and/or the determined second difference d2.

By this arrangement of the first antenna unit and the second antenna unit, it becomes possible to remove the background noise and/or remove the influence of the instability of signal from the transmitter. Further, by using two antenna units or more antenna units, more accurate results can be obtained from the signals.

Accordingly, it becomes possible to receive more information with less noise. As such, this example embodiment further contributes to a more precise application of using microwaves for determining a parameter indicative of the NH3-amount. In addition, it becomes easier to analyse and interpret due to less noise and more sources of information. It is also conceivable that the result becomes more comprehensible, i.e. the spectrum analysis becomes more distinct.

Optionally, but strictly not required, the second antenna unit may be configured to transmit microwave signals across the radial cross-sectional area TR of the SCR module.

According to an example embodiment, the system may further comprise a second antenna unit configured to transmit a microwave signal ST3 to the first antenna unit, and connected to the processing circuitry, wherein the second antenna unit is arranged outside the SCR module and spaced apart from the first antenna unit, the processing circuitry is configured to determine the first difference d between the transmitted microwave signal ST from the first antenna unit and the received reflected microwave signal SRef, R received by the first antenna unit and/or a third difference d3 between the transmitted microwave signal ST3 from the second antenna unit and the received microwave signal SR3 received by the first antenna unit to determine a parameter indicative of the amount of a reducing agent (e.g. amount of NH3) in the SCR catalyst based on the determined first difference d and/or the determined third difference d3.

According to an example embodiment, the first antenna unit and the second antenna unit may be arranged on the same axial distance X, as seen in the axial direction A. One advantage with this arrangement compared to the situation with one antenna unit is that more sources of information are available enabling the processing circuitry to determine a more accurate result based on input from two differences, first difference and second difference. It is also conceivable that the result becomes more comprehensible, i.e. the spectrum analysis becomes more distinct due to more sources of information.

According to an example embodiment, the first antenna unit, the second antenna unit, and a third antenna unit may be arranged on the same axial distance X, as seen in the axial direction A.

According to an example embodiment, a multiple set of antennas may be arranged on the same axial distance X, as seen in the axial direction A.

According to an example embodiment, the first antenna unit may be arranged spaced apart from the second antenna unit, as seen in the axial direction A. One advantage with this arrangement is that the system becomes easier to install in an exhaust aftertreatment system, and may therefore ease the assembly of the components in a vehicle.

According to an example embodiment, the position of the first antenna unit and/or the position of the second antenna unit may be movable along the axial direction A. In this manner, the first antenna unit and/or the second antenna unit are configured to transmit microwave signals across a plurality of radial cross-sectional areas of the SCR module and to receive signals reflected within the SCR module at a plurality of axial positions along the axial direction A. Based on this arrangement, the processing circuitry is capable to determine the parameter indicative of the NH3-amount in the SCR catalyst as a function of the axial length L based on a determined difference between signals transmitted and received at each one of the plurality of axial positions along the axial direction A.

According to an example embodiment, the system may further comprise a third antenna unit configured to transmit and receive a microwave signal, the third antenna unit is connected to the processing circuitry and arranged outside the SCR module and spaced apart from the first antenna unit and second antenna unit.

Moreover, the first antenna unit, the second antenna unit and the third antenna unit are configured to transmit and receive signals in an intermittently manner between each other. Hereby, it becomes possible to carry out measurements at different positions along the axial direction. In this manner, the system can receive information from two different axial distances. In addition, in this arrangement, the three antenna units are operated in an intermittently manner.

It should be readily appreciated that the third antenna unit can be configured to transmit microwave signals towards the SCR module. In addition, or alternatively, the third antenna unit can be configured to transmit signals to the first antenna unit and receive signals from the first antenna unit. Analogously, the third antenna unit can be configured to transmit signals to the second antenna unit and receive signals from the second antenna unit.

According to an example embodiment, the processing circuitry may be configured to:
determine any one of the first difference, the second difference, the third difference, a fourth difference between the transmitted microwave signal ST from the first antenna unit and the received microwave signal SR5 received by the third antenna unit, and/or a fifth difference between the transmitted microwave signal ST4 from the third antenna unit and the received microwave signal SR4 received by the first antenna unit, and determine a parameter indicative of the amount of the reducing agent in the SCR catalyst based on any one of the determined first difference, second difference, third difference, fourth difference and/or fifth difference.

In one example embodiment, the first antenna unit, the second antenna unit and the third antenna unit are arranged on the same axial distance, as seen in the axial direction A.

In one example embodiment, the first antenna unit, the second antenna unit and the third antenna unit are spaced apart from each other, as seen in the axial direction A. Hereby, it becomes possible to carry out measurements at different positions along the axial direction. In this manner, the system can receive information from two different axial distances. According to an example embodiment, the first antenna unit may be arranged spaced apart from the second antenna unit and a third antenna unit, as seen in the axial direction A.

According to an example embodiment, the system may further comprise a casing surrounding the SCR module. Any one of the antenna units can be positioned outside the casing. Alternatively, all antenna units may be arranged outside the casing. This type of arrangement may contribute to a simple installation of the components of the system, in particular the antenna unit(s). In addition, it becomes possible to provide a simpler yet more effective monitoring of the SCR module. The casing may typically include other components, e.g. particle filter and/or an oxygen catalyst. The casing may typically be arranged in-between the SCR module and the first antenna unit, as seen in the radial direction R, or arranged in-between the SCR module and the first and second antenna units.

According to an example embodiment, the microwave signal transmitted from any one of the first antenna unit, the second antenna unit or the third antenna unit may be within a bandwidth having a pre-determined radio frequency. The radio frequency may vary within the range mentioned above.

SCR modules are typically manufactured from various ceramic materials used as a carrier, such as titanium oxide, while the SCR catalysts, i.e. the active catalytic components, are usually either oxides of base metals (such as vanadium, molybdenum and tungsten), zeolites, or various precious metals.

According to an example embodiment, the SCR module may be a honeycomb structure. The honeycomb form typically is an extruded ceramic applied homogeneously throughout the ceramic carrier or coated on the substrate.

According to an example embodiment, the SCR catalyst may be coated onto a wall surface of the honeycomb structure.

According to an example embodiment, the SCR catalyst may be a part of the honeycomb structure.

Another common design of the SCR catalyst geometry is a plate type. Plate-type SCR catalysts have lower pressure drops and are less susceptible to plugging and fouling than the honeycomb types, but plate configurations are much larger and more expensive. Honeycomb configurations are smaller than plate types, but have higher pressure drops and plug much more easily.

According to an example embodiment, the SCR catalyst may be a zeolite-based catalyst or vanadia-based catalyst.

The vanadia-based (e.g. V2O5/TiO2) catalyst is advantageous because this type of catalyst does not require NO2 for efficient selective catalytic reduction of NOx emissions. There is essentially no NO2 available in the exhaust gas directly after the engine or turbocharger outlet port. Furthermore, in the case of misfueling with high-sulphur fuel (e.g. >300 ppm S), some zeolite-based SCR catalysts require elevated temperatures, e.g. 600 degrees C., for removal of adsorbed sulphur species to regain the SCR catalyst performance.

A vanadia-based SCR catalyst is generally very sulphur tolerant and does not require elevated temperatures for removal of adsorbed sulphur species.

The zeolite-based catalyst is advantageous because of its wide active temperature window, good heat-resistance and effective NOx reduction.

In the context of the present invention, it is to be noted that any one of the antenna units can be provided in the form of e.g. a parabolic antenna, a dipole antenna, a directional antenna or any other antenna capable of transmitting and receiving microwaves towards an object/medium. This type of antenna units are commercially available in many forms, and therefore not further described. The selection of type of antenna unit may typically be dependent on the size, shape and/or the ultimate environment of the system.

According to a second aspect of the present invention, there is provided an exhaust aftertreatment system for receiving an exhaust gas, the exhaust aftertreatment system comprising the system according to the invention.

Effects and features of this second aspect of the present invention are largely analogous to those described above in relation to the first aspect of the present invention.

According to an example embodiment, the exhaust aftertreatment system may further comprise an injector for supplying a reducing agent to the exhaust gas at a position upstream of the SCR module.

Typically, the reducing agent may be an ammonia-containing reductant, such as urea.

However, the injector can either supply a gaseous ammonia-containing reductant or a fluid ammonia-containing reductant, such as urea. The injector is typically connected to a gaseous ammonia supply device, which can be implemented in several ways. For example, one or more gas bottles holding pressurized ammonia gas can be provided and coupled to the injector, such that gaseous ammonia may be injected upstream of the SCR module (and SCR catalyst) immediately upon a cold-start, or similar conditions. Replacement and handling of the gas bottles is also relatively easy. According to an alternative embodiment, a storage container may be provided that is configured to store an alkaline earth metal chloride salt, which functions as a source of said gaseous ammonia. The container is preferably heated by electrical wires or the like, thereby facilitating release of gaseous ammonia. Transporting ammonia in a solid storage medium, such as alkaline earth metal chloride salt, results in satisfactory safety and handling of the ammonia source, and only a small amount of heat is required to release the gaseous ammonia. According to yet another alternative, the gaseous ammonia supply device may comprise a storage container holding a solution of ammonia dissolved in a solvent, such as water.

The injector can be formed by a metal pipe that passes through a side wall of an exhaust passage of said exhaust aftertreatment system, and exhibits an discharge opening within said exhaust passage, such that gaseous ammonia from said gaseous ammonia supply device can be supplied to an exhaust gas flow within said exhaust passage by means of said metal pipe.

According to an example embodiment, the exhaust aftertreatment system may further comprise a diesel particulate filter arranged upstream of the injector, and a diesel oxygen catalyst arranged upstream of the diesel particulate filter.

Depending on the type of fuel used, more or less soot and particulate matter is produced. Diesel fuel for example produces more soot and requires thus often a particulate filter for fulfilling legal emission requirements, whereas fuel such as natural gas or dimethyl ether produces generally small amounts of soot, thereby often eliminating the need of a particulate filter.

In other words, the diesel oxygen catalyst, sometimes also called the oxidation catalyst, typically is located downstream of said SCR module and upstream of said particulate filter.

The diesel oxygen catalyst serves to oxidise hydrocarbons and carbon monoxide into carbon dioxide and water. The oxidation catalyst also increases the exhaust temperature.

According to a third aspect of the present invention, there is provided an internal combustion engine producing an exhaust gas, and operatively connected to an exhaust aftertreatment system according to the invention. The internal combustion engine is suitable for a vehicle.

It is to be noted that in some applications, the internal combustion engine might instead include the exhaust aftertreatment system. In another type of system, there is provided a power train including an internal combustion engine operatively connected to the exhaust aftertreatment system.

Effects and features of this third aspect of the present invention are largely analogous to those described above in relation to the first and second aspects of the present invention.

Further, it goes without saying that the exhaust aftertreatment system includes the system according to any one of the example embodiments as mentioned above with respect to the first aspect of the present invention.

The internal combustion engine can work, for instance, according to the four-stroke and/or two-stroke principle. The combustion engine may be a compression ignition, spark ignition engine or a piston compressor. As an example, the internal combustion engine can be designed to work according to the diesel process.

Further, the internal combustion engine can be installed in a vehicle, such as a truck.

The invention also relates to a vehicle comprising an exhaust aftertreatment system according to any one of the aspects and/or example embodiments as mentioned above with respect to the second aspect of the present invention, i.e. the aspects relating to the exhaust aftertreatment system. Accordingly, the invention also relates to a vehicle comprising an internal combustion engine head according to any one of the aspects and/or example embodiments as mentioned above with respect to the third aspect of the present invention, i.e. the aspects relating to the internal combustion engine. Accordingly, the invention also relates to a vehicle comprising a system according to any one of the aspects and/or example embodiments as mentioned above with respect to the first aspect of the present invention.

Thus, according to a fourth aspect of the present invention, there is provided a vehicle comprising an exhaust aftertreatment system according to any one of the other aspects and/or example embodiments of the present invention as mentioned above.

Effects and features of this fourth aspect of the present invention are largely analogous to those described above in relation to the first, second and third aspects of the present invention.

Although the invention will be described in relation to a truck, the invention is not restricted to this particular vehicle, but may also be used in other type of vehicles such as buses, construction equipment, cars, industrial construction machines, wheel loaders, etc.

According to a fifth aspect of the present invention there is provided a method for determining a parameter indicative of an amount of a reducing agent in a system of a vehicle, the system including a selective catalytic reduction (SCR) module (10), a first antenna unit configured to transmit and receive a microwave signal, wherein the first antenna unit is arranged outside the SCR module and configured to transmit microwave signals ST towards the SCR catalyst and to receive a microwave signal S ef, R reflected within the SCR module, and a processing circuitry connected to the first antenna unit, wherein the SCR module having at least one passage for transporting a stream of gas and an SCR catalyst for converting NOx emissions, and having an extension in an axial direction A. Moreover the method includes the steps of:
 transmitting a microwave signal ST from the first antenna unit and towards the SCR catalyst, whereby the microwave signal ST is reflected within the SCR module,
 receiving the reflected microwave signal SRef, R by the first antenna unit,—determining a first difference d between the transmitted microwave signal ST and the received reflected microwave signal SRef, R by the processing circuitry, and
 determining a parameter indicative of the amount of a reducing agent in the SCR catalyst based on the determined difference d between the transmitted microwave signal ST and the received reflected microwave signal SRef, R.

Effects and features of this fifth aspect of the present invention are largely analogous to those described above in relation to the system aspects of the present invention.

According to an example embodiment, the method may further include the step of controlling a supply of a reducing agent to the exhaust gas at a position upstream of the SCR module.

Typically, the reducing agent may be an ammonia-containing reductant, such as urea. Hence, one example of an ammonia-containing reductant is urea.

According to an example embodiment, and as mentioned above, the system may further include a second antenna unit configured to transmit and receive a microwave signal and connected to the processing circuitry, wherein the second antenna unit is arranged outside the SCR module, and spaced apart from the first antenna unit. In this example embodiment, the method may further include the step of intermittently switching the operation of the first antenna unit and the second antenna unit between transmitting signals and receiving signals.

According to an example embodiment, the method may further include the steps of:
 determining the first difference between the transmitted microwave signal ST from the first antenna unit and the received reflected microwave signal SRef, R received by the first antenna unit, a second difference between the transmitted microwave signal ST from the first antenna unit and a received microwave signal SR2 received by the second antenna unit and/or a third difference between the transmitted microwave signal ST3 from the second antenna unit and the received microwave signal SR3 received by the first antenna unit,
 determining a parameter indicative of the amount of the reducing agent in the SCR catalyst based on the determined first difference, the determined second difference and/or the determined third difference.

According to an example embodiment, the method may further include the steps of:
 transmitting a plurality of microwave signals, from the first antenna unit (20) and/or the second antenna unit, across a plurality of radial cross-sectional areas of the SCR module, whereby the plurality of the microwave signals are reflected within the SCR module,
 receiving the reflected plurality of signals at a plurality of axial positions along the axial direction, by the first antenna unit and/or the second antenna unit,—determining a difference of each one of the received microwave signals so that a plurality of differences is determined by the processing circuitry, and
 determining a parameter indicative of the amount of the reducing agent in the SCR catalyst as a function of the axial length L based on any one of the determined differences of each one of the reflected microwave signal SR. According to a sixth aspect there is provided a computer program comprising program code means for performing the method steps of the present invention, when the program is run on a computer.

According to a seventh aspect there is provided a computer readable medium carrying a computer program comprising program code means for performing the method steps of the present invention, when the program product is run on a computer.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
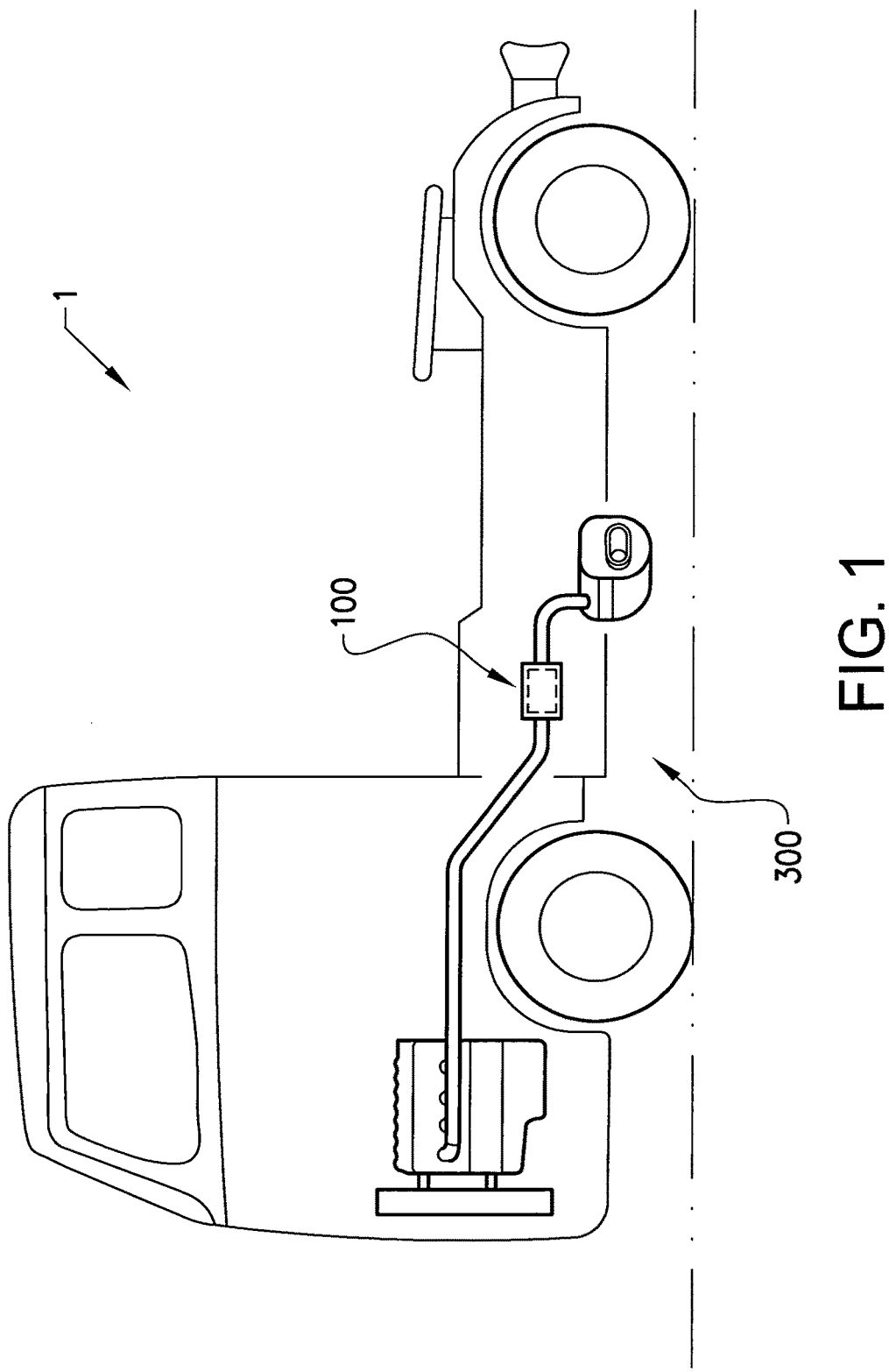
FIG. 1 is a perspective view of a vehicle including a system according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiment set forth herein; rather, these embodiments are provided for thoroughness and completeness. Like reference character refer to like elements throughout the description.

Referring now to the drawings and to FIG. 1 in particular, there is depicted a vehicle including a system according to an example embodiment of the present invention. The vehicle 1 illustrated in FIG. 1 here further includes an internal combustion engine 300 producing an exhaust gas and an exhaust aftertreatment system 100. The vehicle 1 in FIG. 1 is provided in the form of a truck. The exhaust aftertreatment system 100 here is utilized for an internal combustion engine of the diesel type. Accordingly to the example embodiment of the present invention, the diesel engine is intended for use in truck. The diesel engine may for instance include six cylinders (not shown). The invention is however not limited to any specific number of cylinders or any specific cylinder configuration.

The exhaust aftertreatment system 100 and the system according to the present invention are described in further detail with reference to FIG. 2 and FIGS. 3a-3f.

Figure 2:
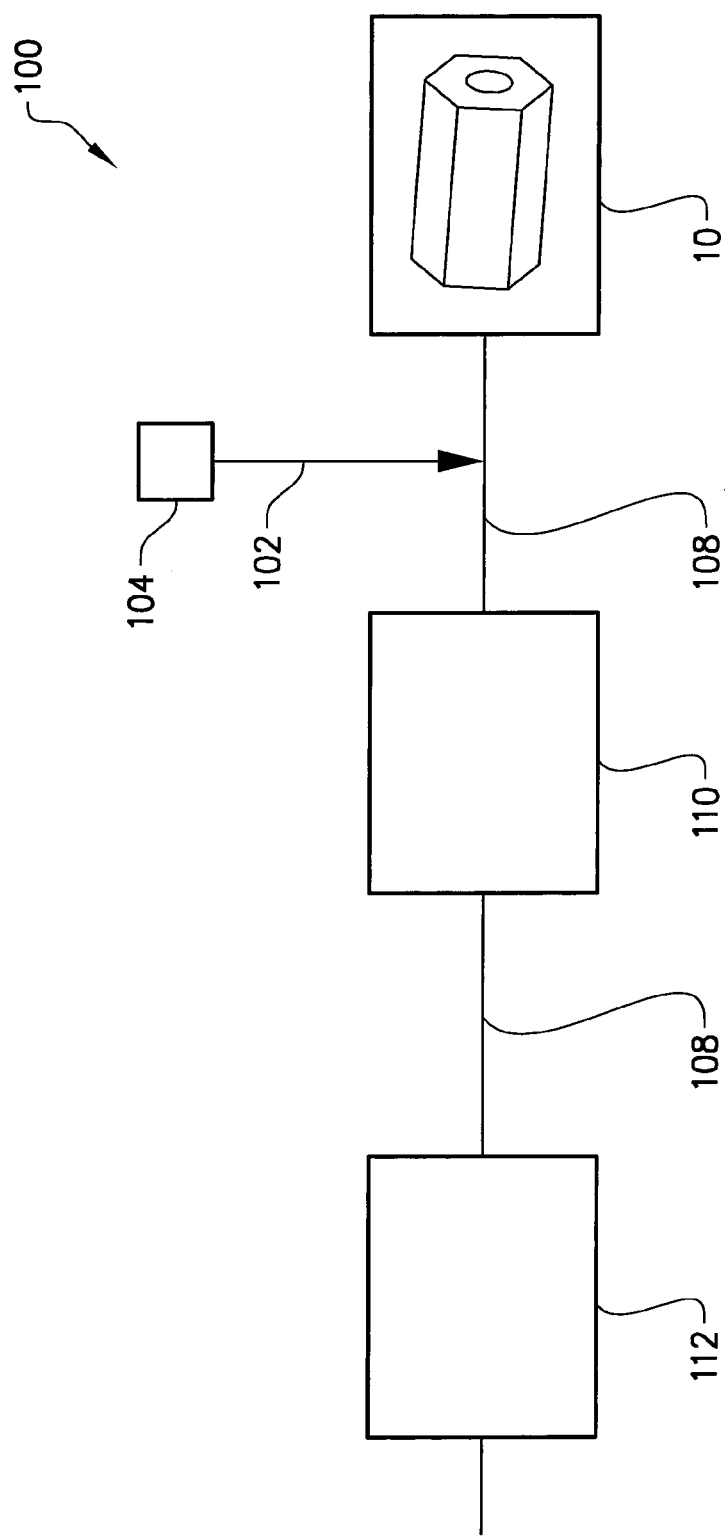
FIG. 2 schematically illustrates a first example embodiment of a part of an exhaust aftertreatment system including a system according to the present invention, wherein the system is arranged for determining a parameter indicative of an NH3-amount in a selective catalytic reduction (SCR) module.

Turning now to FIG. 2, a first example embodiment of a part of an exhaust aftertreatment system including a system according to the present invention is schematically illustrated. In this example, the system is arranged for determining a parameter indicative of an NH3-amount in a selective catalytic reduction (SCR) module 10. Further, the exhaust aftertreatment system 100 of a diesel engine, in particular for a truck, is designed for receiving an exhaust gas 108. The specific exhaust aftertreatment system 100 shown includes a particulate filter 110 to reduce the level of particulate matter. NOx emission from the engine 300 must also be reduced to comply with regulatory emission standards, and an SCR module 10 including an SCR catalyst 12 is installed along the exhaust gas pipe 108 for this reason. The exhaust gas pipe is designed to transport an exhaust gas through the exhaust aftertreatment system. Selective catalytic reduction is a means of converting NOx with the aid of the SCR catalyst into nitrogen (N2) and water (H2O). A reductant, typically urea, is added to the exhaust gas stream upstream of the SCR module 10 by means of a reductant injector 102, and converted to ammonia upon hydrolysis, which ammonia may be adsorbed onto the SCR catalyst 12. The SCR module 10 here is provided in the form of an iron- or copper-based zeolite type. In another example embodiment, the SCR module may be provided in the form of a vanadium-based type. Control of reductant injection rate at the injector 102 may be based on a reductant dosing model, which may use different parameters as input signals, such as temperature of the exhaust gas entering the SCR module 10 as provided by a temperature sensor.

Accordingly, and as illustrated in FIG. 2, the example embodiment of the exhaust aftertreatment system 100 here comprises an injector 102 for supplying an ammonia-containing reductant 104, such as urea, to the exhaust gas 108 at a position upstream of the SCR module 10. Moreover, the exhaust aftertreatment system 100 in FIG. 2 here comprises a diesel particulate filter 110, which is arranged upstream of the injector 102, and a diesel oxygen catalyst 112, which is arranged upstream of the diesel particulate filter 110.

The SCR module 10 will now be described in greater detail with reference to FIGS. 3a-3f. In all example embodiments of the present invention, the SCR module 10 is adapted to carry out a selective catalytic reduction (SCR) for reducing NOx emissions. The use of selective catalytic reduction (SCR) for reducing NOx emissions is widespread within the automotive industry, with the most common technology using urea ($NH_2CONH_2$) as a precursor to ammonia ($NH_3$) for the catalytic removal of NOx emissions. More specifically, selective catalytic reduction (SCR) is a means of converting nitrogen oxides, also referred to as NOx with the aid of a catalyst into diatomic nitrogen, $N_2$, and water, $H_2O$. A gaseous reductant, typically anhydrous ammonia, aqueous ammonia or urea, is added to the stream of exhaust gas and is adsorbed onto a catalyst Carbon dioxide, $CO_2$ is a reaction product when urea is used as the reductant. The invention is not limited to urea as ammonia-containing reductant, but other reductant types currently used in SCR applications may alternatively be used, such as aqueous ammonia.

The NOx reduction reaction takes place as the exhaust gases pass through the SCR catalyst 12 of the SCR module 10. Before entering the SCR module 10, the ammonia, or other reductant (such as urea), is injected by the injector and mixed with the gases. The chemical equation for a stoichiometric reaction using either anhydrous or aqueous ammonia for a selective catalytic reduction process is:

$$4NO + 4NH_3 + O_2 \rightarrow 4N_2 + 6H_2O$$

$$2NO_2 + 4NH_3 + O_2 \rightarrow 3N_2 + 6H_2O$$

$$NO + NO_2 + 2NH_3 \rightarrow 2N_2 + 3H_2O$$

With several secondary reactions:

$$2SO_2 + O_2 \rightarrow 2SO_3$$

$$2NH_3 + SO_3 + H_2O \rightarrow (NH_4)_2SO_4$$

$$NH_3 + SO_3 + H_2O \rightarrow NH_4HSO_4$$

The reaction for urea instead of either anhydrous or aqueous ammonia is:

$$4NO + 2(NH_2)_2CO + O_2 \rightarrow 4N_2 + 4H_2O + 2CO_2$$

Although not explicitly shown in the figures, the SCR module 10 is provided with an inlet for the receiving the exhaust gas and an outlet. The inlet and the outlet are here represented by the passages 14.

Figure 3A:
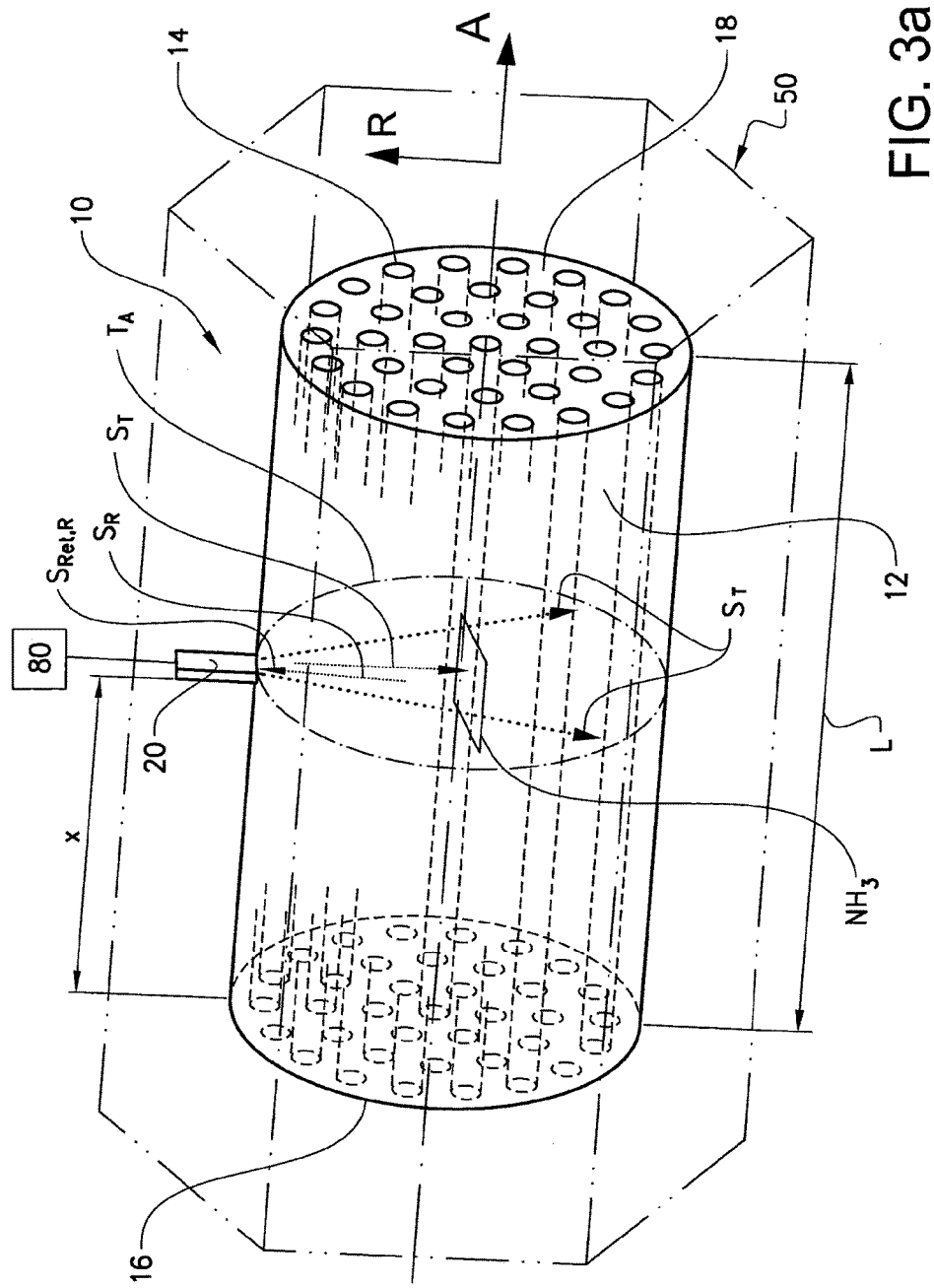
FIG. 3a is a schematic perspective view of a first example embodiment of a system according to the present invention, wherein the system includes one antenna unit and an SCR module.

Besides the SCR module 10, FIG. 3a illustrates a first example embodiment of a system according to the present invention. As will be appreciated from the description hereinafter, the system in FIG. 3a is used for determining a parameter indicative of an NH3-amount in a selective catalytic reduction (SCR) module 10 of a vehicle 1. Accordingly, it should be readily appreciated that when the system is installed and in operation, the SCR module is capable of receiving NH3 injected into the exhaust aftertreatment system by the injector, as mentioned above.

In this example embodiment, the system includes one antenna unit 20 and the SCR module 10. Further, in this example embodiment and in the example embodiments in FIG. 3b-3f, and other possible embodiments, the SCR module 10 here is a honeycomb structure. The honeycomb structure includes a plurality of passages 14 for transporting the stream of gas through the SCR module, as seen in an axial direction A. The SCR module further includes the SCR catalyst 12, as mentioned above. Although not strictly required, the SCR catalyst 12 here is coated onto each one of the wall surfaces of the honeycomb structure, thereby encircling (or defining) the passages 14. The wall surface here corresponds to an inner surface of the passages 14. In other words, the SCR catalyst is arranged so that the active component is capable of chemically interact with the content of the exhaust gas, i.e. the reducing agent. To this end, the SCR catalyst 12 here is a part of the honeycomb structure. As mentioned above, the SCR catalyst 12 may for example be a zeolite-based catalyst. Alternatively, the SCR catalyst may be a vanadia-based catalyst.

In the example embodiment illustrated in FIG. 3a, the system comprises the SCR module 10 having at least one passage 14 for transporting a stream of gas and the SCR catalyst 12 for converting NOx emissions. The SCR module 10 has an extension in an axial direction A. In addition, since the SCR module here is depicted in the form of a cylinder, the SCR module also has an extension in a radial direction R. It is to be noted that a cylindrical shaped module is only one of many possible shapes, and other shapes are therefore conceivable.

The system further includes a first antenna unit 20 configured to transmit a microwave signal ST and receive a microwave signal SR. Moreover, the first antenna unit 20 is arranged outside the SCR module 10 and configured to transmit microwave signals ST towards the SCR catalyst 12 and to receive a microwave signal SRef, R reflected within the SCR module 12. That is, the first antenna unit is arranged outside the gas passages 14 containing the exhaust gas and the direction of the stream of gas during operation of the SCR module.

In addition, by being configured to transmit microwave signals ST towards the SCR catalyst 12, the antenna unit here is configured to transmit microwave signals across a cross sectional area TA of the SCR module 10. Typically, the microwave signals are transmitted across a cross sectional area being substantially perpendicularly orientated to the axial direction A. As illustrated in FIG. 3a, the SCR module here is a cylinder, i.e. a cylindrical shaped module. In other words, the cross sectional area TA here corresponds to a radial cross sectional area of the SCR module. The radial cross sectional area of the SCR module is typically perpendicular to the axial direction A, or at least substantially perpendicular to the axial direction.

Accordingly, as is illustrated in the example embodiment in FIG. 3a, and in all other example embodiments in FIG. 3b-3f, the antenna unit 20 here is arranged outside an outer circumferential surface of the cross sectional area TA of the SCR module 10, the cross sectional area TA being perpendicular to the axial direction of the SCR module 10. Analogously, as described hereinafter, the second antenna unit 30 and the third antenna unit 40 are here also arranged outside an outer circumferential surface of the cross sectional area TA of the SCR module 10, the cross sectional area TA being perpendicular to the axial direction of the SCR module 10.

Optionally, although not strictly necessary, the SCR module 10 typically is configured to direct the gas stream in parallel with the axial direction A. Accordingly, the passage(s) 14 extends in parallel with the axial direction A.

As may be gleaned from FIG. 3a, the antenna unit 10 is in this example embodiment, also positioned within a distance in the axial direction A limited by end portions 16, 18 of the SCR module in the axial direction A. Accordingly, if the end portion 6 corresponds to the front of the SCR module, the axial distance X can be measured from the front, as is illustrated in FIG. 3a. In other words, the axial distance X generally refers to the distance between the antenna unit and the end portion (e.g. the front) of the SCR module. The SCR module here also has a length L, as seen in the axial direction, which is defined by the distance between the end portions of the SCR module, i.e. the distance between the front and back of the SCR module, as seen in the axial direction A.

Typically, the antenna unit can generate and transmit a signal from the antenna unit and either partly or completely through the SCR module (depending on the reflection within the SCR module), as illustrated in FIG. 3a. The antenna unit could for instance transmit a microwave signal having a radio frequency of a single selected bandwidth or frequency. This may be sufficient if it can be determined that the dielectric property of the SCR catalyst is within an absorbance or resonance frequency in the bandwidth. Alternatively, the antenna unit may be configured to sweep over larger frequency ranges by transmitting different RF signals of different frequency bandwidths. This configuration may be particularly useful if the SCR catalyst has absorbance and/or resonance tops at different frequencies that are not coverable by the limited bandwidth of a single RF signal. The antenna unit can then be arranged for providing a signal train of increasing or decreasing frequencies.

Throughout this description, it is to be noted that the received reflected microwave signal SRef, R may refer to a signal which has been reflected within the SCR module 10 and at the SCR catalyst 12, and which is received by an antenna unit.

The system also includes a processing circuitry 80 connected to the first antenna unit 20. The processing circuitry 80 is configured to determine a difference d between the transmitted microwave signal ST and the received reflected microwave signal SRef, R and to determine a parameter indicative of the NH3-amount in the SCR catalyst 12 based on the determined difference d between the transmitted microwave signal ST and the received reflected microwave signal SRef, R.

In this manner, the system is capable of determining a parameter indicative of an NH3-amount in the SCR module 10 of the vehicle 1. More specifically, due to the arrangement of the first antenna unit 20, the system is configured to determine the NH3-amount in the SCR catalyst 12 at a given axial distance X. In the example embodiment illustrated in FIG. 3a, the position of the first antenna unit corresponds to the axial distance X.

Typically, although not strictly required, the processing circuitry here is configured to perform a spectral analysis of the received reflected microwave signal by analyzing the amplitude and/or phase at different frequencies. By detecting changes in the amplitude and/or phase at selected frequencies, the processing circuitry 80 is capable to determine a difference as mentioned above. Further, the processing circuitry here is configured to determine a parameter indicative of the NH3-amount based on the difference.

Typically, although not strictly required, the transmitted microwave signal can be within a bandwidth having a predetermined radio frequency. By having knowledge of the contents of the transmitted microwave signal, the processing circuitry is capable of detecting and determining a difference between the transmitted microwave signal ST and the received reflected microwave signal SRef, R. As an example, and as mentioned above, the difference d may here correspond to a difference in pulse between the transmitted microwave signal ST and the received reflected microwave signal SRef, R. If a difference is determined by the processing circuitry, it can proceed to determine the parameter being indicative of the NH3-amount in the SCR catalyst 12 based on the determined difference d. In this example embodiment, the parameter relates to the NH3-concentration of the SCR catalyst 12.

Figure 3B:
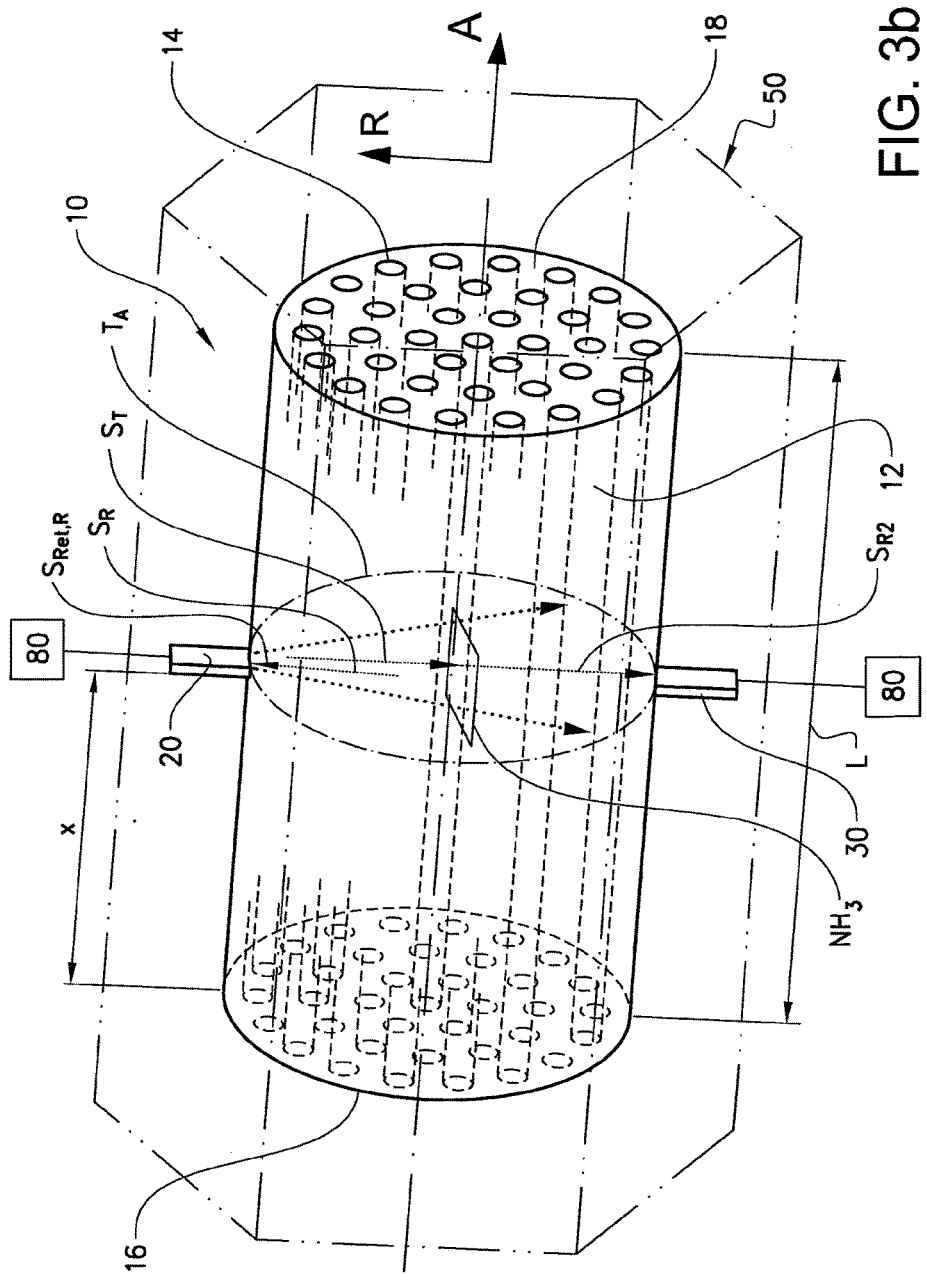
FIG. 3b is a schematic perspective view of a second example embodiment of a system according to the present invention, wherein the system includes a first antenna unit and a second antenna unit, and an SCR module.

FIG. 3b is a schematic perspective view of a second example embodiment of a system according to the present invention. Also this system is used for determining a parameter indicative of an NH3-amount in a selective catalytic reduction (SCR) module 10 of a vehicle 1.

As described above in relation to the first example embodiment, the system in FIG. 3b comprises the SCR module 10 having at least one passage 14 for transporting a stream of gas and the SCR catalyst 12 for converting NOx emissions. The SCR module 10 has an extension in an axial direction A. In addition, the system is provided with the first antenna unit 20 being configured to transmit and receive a microwave signal. Moreover, the first antenna unit 20 is arranged outside the SCR module 10 and configured to transmit microwave signals ST towards the SCR catalyst 12 and to receive a microwave signal SR reflected within the SCR module 12. However, as illustrated in FIG. 3b, the system according to the second example embodiment is further provided with a second antenna unit 30.

The second antenna unit 30 is configured to receive the transmitted microwave signal ST from the first antenna unit 20, and connected to the processing circuitry 80. Moreover, the second antenna unit 30 is arranged outside the SCR module 10 and spaced apart from the first antenna unit 20.

As illustrated in FIG. 3b, the first antenna unit here is arranged spaced apart from the second antenna unit, as seen in the circumferential direction of the SCR module. Further, according to this example embodiment, the first antenna unit 20 and the second antenna unit 30 are still arranged on the same axial distance X, as seen in the axial direction A.

As a consequence of having a system with two antenna units, the processing circuitry 80 here is configured to determine the first difference d between the transmitted microwave signal ST from the first antenna unit 20 and the received reflected microwave signal SRef, R received by the first antenna unit 20 and/or a second difference d2 between the transmitted microwave signal ST from the first antenna unit 20 and a received microwave signal SR2 received by the second antenna unit 30 to determine a parameter indicative of the NH3-amount in the SCR catalyst 12 based on the determined first difference d and/or the determined second difference d2.

As is illustrated in FIG. 3b, it should be readily understood that the received microwave signal SR2 being received by the second 30 has been transmitted by the first antenna unit (corresponding to the transmitted signal ST). Thereby, it has been transmitted through the SCR module without being reflected within the module.

Moreover, details of the system and individual features of this system are the same as those described in relation to FIGS. 2 and 3a, above.

By this arrangement of the first antenna unit and the second antenna unit, it becomes possible to remove the background noise and/or remove the influence of the instability of signal from the transmitter. Further, by using two antenna units or more antenna units, more accurate results can be obtained from the signals.

Another advantage with this arrangement compared to the situation with one antenna unit is that more sources of information are available enabling the processing circuitry to determine a more accurate result based on input from two differences, first difference and second difference. It is also conceivable that the result becomes more comprehensible, i.e. the spectrum analysis becomes more distinct due to more sources of information.

Although it is mentioned above that the second antenna unit is configured to receive signals from the first antenna unit, it should be readily appreciated that in all example embodiments including two antenna units or more, each antenna unit is capable of transmitting and receiving microwave signals. However, each antenna unit may typically not transmit and receive signals simultaneously, but intermittently.

Figure 3C:
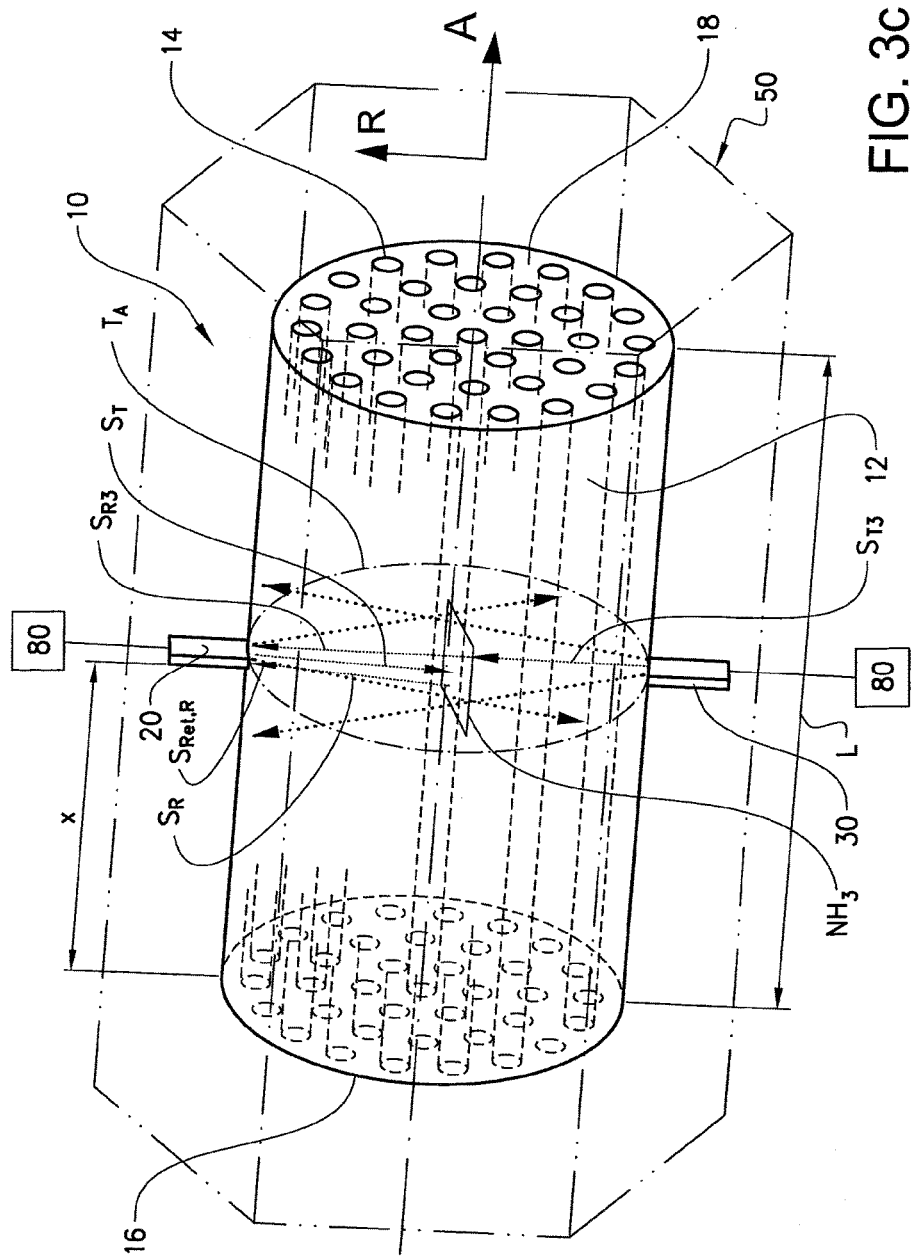
FIG. 3c is a schematic perspective view of a third example embodiment of a system according to the present invention, wherein the system includes a first antenna unit and a second antenna unit, and an SCR module.

Accordingly, in addition, or alternatively, to the above details relating to the second example embodiment in FIG. 3b, the system may also be configured according to the principle illustrated in FIG. 3c. In this example embodiment, the second antenna unit 30 is configured to transmit a microwave signal ST3 to the first antenna unit 20. Analogous to the example embodiment in FIG. 3b, the first antenna unit and the second antenna unit are connected to the processing circuitry 80.

Moreover, the second antenna unit 30 is arranged outside the SCR module 10 and spaced apart from the first antenna unit 20. Further, in this example embodiment, the processing circuitry 80 here is configured to determine the difference d between the transmitted microwave signal ST from the first antenna unit 20 and the received reflected microwave signal SRef, received by the first antenna unit 20 and/or a third difference d3 between the transmitted microwave signal ST3 from the second antenna unit 30 and the received microwave signal SR3 received by the first antenna unit 20 to determine a parameter indicative of the NH3-amount in the SCR catalyst 12 based on the determined difference d and/or the determined third difference d3.

As mentioned above, the two principles relating to the second example embodiment in FIG. 3b and the example embodiment in FIG. 3c, can be operated individually at different intervals, i.e. intermittently, in the same system. However, it is also possible that the system only includes one of them in order to obtain the technical effects of the present invention, as described herein.

Accordingly, if the two principles are combined in the system, it should be readily appreciated that the processing circuitry 80 may be configured to determine the first difference, the second difference and/or the third difference, and to determine a parameter indicative of the NH3-amount in the SCR catalyst 12 based on the first difference, the second difference and/or the third difference.

Moreover, details of the system and individual features of this system are the same as those described in relation to FIGS. 2 and 3a, above.

One advantage with this arrangement compared to the situation with one antenna unit is that more sources of information are available enabling the processing circuitry to determine a more accurate result based on input from two differences, first difference and second difference. It is also conceivable that the result becomes more comprehensible, i.e. the spectrum analysis becomes more distinct due to more sources of information.

Figure 3D:
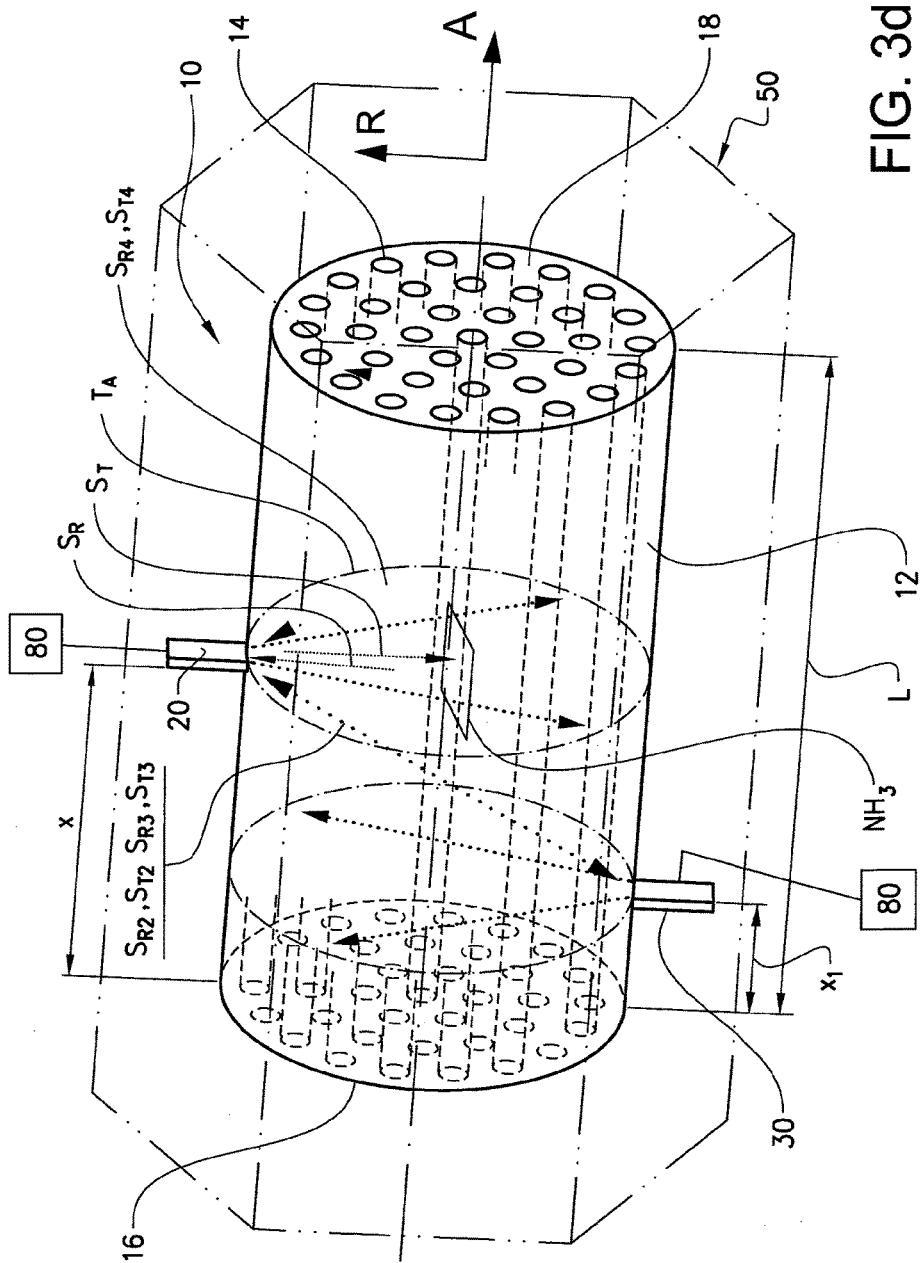
FIG. 3d is a schematic perspective view of a fourth example embodiment of a system according to the present invention, wherein the system includes a first antenna unit and a second antenna unit arranged spaced apart as seen in an axial direction, and an SCR module.

FIG. 3d is a schematic perspective view of a third example embodiment of a system according to the present invention. Also this system is used for determining a parameter indicative of an NH3-amount in a selective catalytic reduction (SCR) module 10 of a vehicle 1. In this example embodiment, the features of the system are the same as described for the embodiment in FIG. 3b and/or 3c, above. Hence, the system may optionally include the details relating to the SCR module, the first antenna, the second antenna and the processing circuitry. One difference between the embodiment depicted in FIG. 3b and the embodiment depicted in FIG. 3d is that the first antenna unit 20 and the second antenna unit 30 are arranged spaced apart, as seen in an axial direction. As an example, the first antenna unit 20 is arranged at the distance x from the front end 16, while the second antenna unit 30 is arranged at a distance Xi from the front end 16.

One advantage with this arrangement is that the system becomes easier to install in an exhaust aftertreatment system, and may therefore ease the assembly of the components in a vehicle.

Another advantage is that the measurements are carried out at different positions along the axial direction. In this manner, the system can receive information from two different axial distances.

Figure 3E:
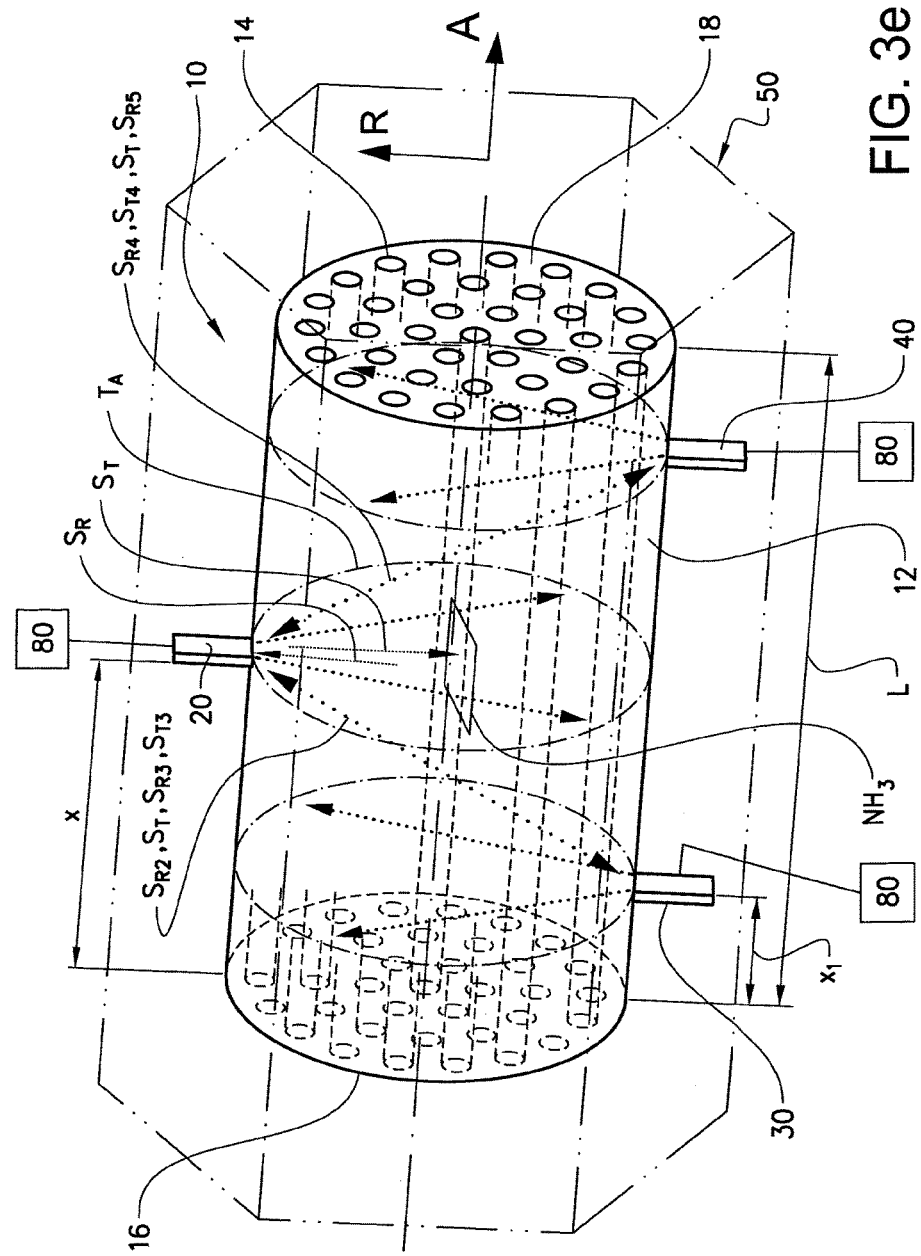
FIG. 3e is a schematic perspective view of a fifth example embodiment of a system according to the present invention, wherein the system includes a first antenna unit, a second antenna unit and a third antenna unit, and an SCR module.

FIG. 3e is a schematic perspective view of a fifth example embodiment of a system according to the present invention. Also this system is used for determining a parameter indicative of an NH3-amount in a selective catalytic reduction (SCR) module 10 of a vehicle 1. In this example embodiment, the features of the system are the same as described for any one of the embodiment in FIG. 3a-3d, above. Hence, the system may optionally include the details relating to the SCR module, the first antenna, the second antenna and the processing circuitry. In addition, the system in FIG. 3e is provided with a third antenna unit 40. The third antenna may include any one of the details described above with respect to the first antenna unit 20 and/or the second antenna unit 30. For example, the third antenna unit 40 can be configured to transmit a microwave signal to the first antenna unit 20 and/or receive a microwave signal from the first antenna unit 20. In addition, or alternatively, the third antenna unit 40 can be configured to transmit a microwave signal to the second antenna unit 20 and/or receive a microwave signal from the second antenna unit 20. In addition, or alternatively, the first antenna unit 20 can be configured to transmit and/or receive microwave signals from the third antenna unit 40. In addition, or alternatively, the second antenna unit 30 can be configured to transmit and/or receive microwave signals from the third antenna unit 40.

Similar to the configuration with the first and second antenna units, the third antenna unit 40 is connected to the processing circuitry 80 and arranged outside the SCR module 10 and spaced apart from the first antenna unit 20 and second antenna unit 30.

Accordingly, the system and the interaction between the set of antennas 20, 30, 40 and the processing circuitry 80 can be carried out in a similar manner as described above. In particular, the third antenna unit 40 can be arranged and configured in a similar way as the possible configurations described above with respect to the second antenna unit 30 and according to the principles relating to the example embodiments in FIG. 3b and/or 3c. More specifically, the third antenna unit 40 can both transmit and receive microwave signals, and is connected to the processing circuitry. As such, the first antenna unit 20, the second antenna unit 30 and the third antenna unit 40 can transmit and receive microwave signals in an intermittently manner, as described above. That is, the antenna units can be operated individually at different intervals, i.e. intermittently, by the processing circuitry. In this manner, the antenna units can be controlled so that only one of them is transmitting signals while another antenna unit is receiving the signal at a certain time.

The nature and features of the third antenna unit 40 correspond to those given above for the first antenna unit and the second antenna unit.

In summary, this example embodiment here includes the third antenna unit 40 being configured to transmit and receive a microwave signal. The third antenna unit 40 is connected to the processing circuitry 80 and arranged outside the SCR module 10 and spaced apart from the first antenna unit 20 and second antenna unit 30. Moreover, the first antenna unit 20, the second antenna unit 30 and the third antenna unit 40 are configured to transmit and receive signals in an intermittently manner between each other.

Besides that the processing circuitry can determined the first difference, the second difference and the third difference, as mentioned above with respect to the other example embodiments, the processing circuitry here is configured to:
determine any one of the first difference, the second difference, the third difference, a fourth difference between the transmitted microwave signal ST from the first antenna unit 20 and the received microwave signal SR5 received by the third antenna unit 40, and/or a fifth difference between the transmitted microwave signal ST4 from the third antenna unit 40 and the received microwave signal SR4 received by the first antenna unit 20.

Moreover, the processing circuitry here is configured to determine a parameter indicative of the amount of the reducing agent in the SCR catalyst 12 based on any one of the determined first difference, second difference, third difference, fourth difference and/or fifth difference.

In this example embodiment, it is to be noted that the transmitted microwave signal ST is transmitted by the first antenna unit and can be received by either the second antenna unit 30 (which in FIG. 3e corresponds to the received microwave signal SR2) or the third antenna unit 40 (which in FIG. 3e corresponds to the received microwave signal SR5—received by the third antenna unit 40).

In addition, the transmitted microwave signal ST refers to the signal transmitted from the third antenna unit 40, while the received microwave signal SR4 refers to the signal received by the first antenna unit 20 which was transmitted from the third antenna unit 40 (transmitted microwave signal ST4)—It is to be noted that FIG. 3e only is a schematic view of the various signals intended to illustrate the intermittently direction of the signals and not every single signal and direction, and therefore a number of signals between two antenna units are illustrated by a common dashed line.

Figure 3F:
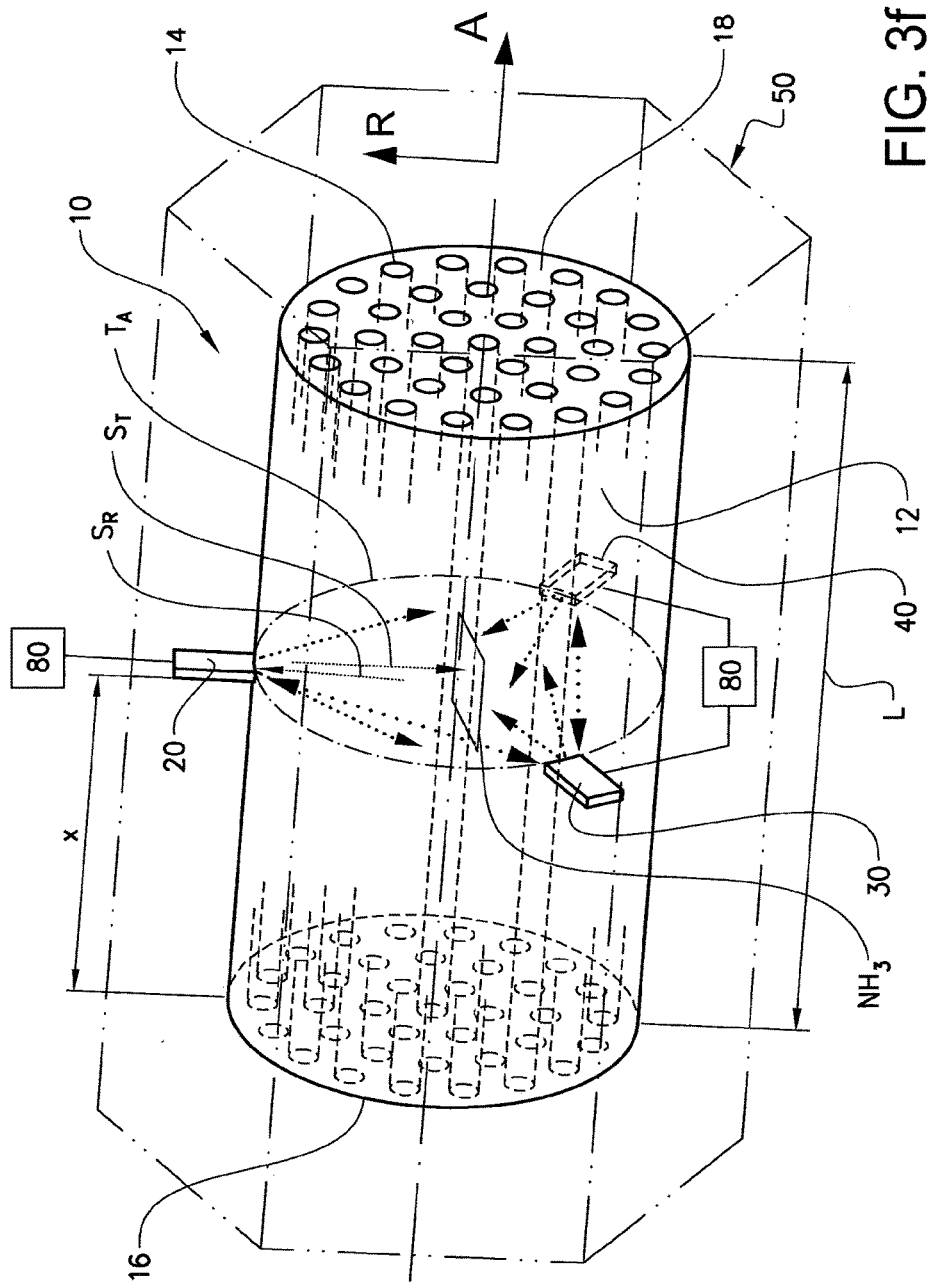
FIG. 3f is a schematic perspective view of a sixth example embodiment of a system according to the present invention, wherein the system includes a first antenna unit, a second antenna unit and a third antenna unit, and an SCR module.

Moreover, as may be gleaned from FIG. 3e, the third antenna unit 40 is in this example embodiment spaced apart from the second antenna unit 30, as seen in the axial direction A. Analogously, the third antenna unit 40 is in this example embodiment spaced apart from the first antenna unit 30, as seen in the axial direction A. However, several different arrangements are possible according to the present invention. One example of another arrangement is illustrated in FIG. 3f. In this example embodiment, the first antenna unit 20, the second antenna unit 30 and the third antenna unit 40 are arranged spaced apart from each other, as seen in the circumferential direction of the SCR module. Further, according to this example embodiment, the first antenna unit 20, the second antenna unit 30 and the third antenna unit 40 are still arranged on the same axial distance X, as seen in the axial direction A.

In another example embodiment (although not shown), any one of the antenna units can be movably arranged along the axial direction A. Hence, the position of the first antenna unit 20 may be movable along the axial direction A. In addition, or alternatively, the position of the second antenna unit 30 may be movable along the axial direction A. In addition, or alternatively, the position of the third antenna unit 30 may be movable along the axial direction A. As an example, any one of the antenna units can be movably arranged by means of a sliding mechanism including a movable member arranged in a trajectory along the SCR module.

In all example embodiments of the present invention, the system may further include a casing 50 surrounding the SCR module 10. Accordingly, the first antenna unit 20 can be positioned outside the casing. In addition, or alternatively, the second antenna unit 30 can be positioned outside the casing. In addition, or alternatively, the third antenna unit 30 can be positioned outside the casing. In one example embodiment (although not shown), all antenna units are positioned outside the casing 50. The casing may typically enclose the various components of the exhaust aftertreatment system 100, as illustrated in FIG. 2.

In all example embodiments of the present invention, the microwave signal transmitted from the first antenna unit 20 may be within a bandwidth having a predetermined radio frequency.

In addition, or alternatively, in all example embodiments of the present invention including the second antenna unit 20, the microwave signal transmitted from the second antenna unit 20 may be within a bandwidth having a pre-determined radio frequency.

In addition, or alternatively, in all example embodiments of the present invention including the third antenna unit 40, the microwave signal transmitted from the third antenna unit 40 may be within a bandwidth having a pre-determined radio frequency.

Moreover, the example embodiment relating to and illustrated in FIG. 3a can be operated according to the following principle. As mentioned above, the system includes the selective catalytic reduction (SCR) module 10 and the first antenna unit 20 configured to transmit and receive a microwave signal. The first antenna unit 20 being arranged outside the SCR module 10 and configured to transmit microwave signals ST towards the SCR catalyst 12 and to receive a microwave signal SRef, R reflected within the SCR module 10. The system further includes the processing circuitry 80 connected to the first antenna unit 20. The SCR module 10 has at least one passage 14 for transporting a stream of gas and the SCR catalyst 12 for converting NOx emissions, and having an extension in the axial direction A.

In order to operate this type of system, the method includes the steps of:
transmitting a microwave signal ST from the first antenna unit 20 and towards the SCR catalyst 12, whereby the microwave signal ST is reflected within the SCR module 10,
receiving the reflected microwave signal SRef, R by the first antenna unit 20,—determining a first difference d between the transmitted microwave signal ST and the received reflected microwave signal SRef, R by the processing circuitry 80, and
determining a parameter indicative of the amount of a reducing agent in the SCR catalyst 12 based on the determined first difference d between the transmitted microwave signal ST and the received reflected microwave signal $S_{Ref, R}$.

By this principle, the method is capable of determining a parameter indicative of an amount of a reducing agent in a system of a vehicle.

The method may further include the step of controlling a supply of a reducing agent to the exhaust gas at a position upstream of the SCR module.

Moreover, the example embodiment relating to and illustrated in FIG. 3b and/or 3c can be operated according to the following principle. As mentioned above, the system here further includes the second antenna unit 30 configured to transmit and receive a microwave signal and connected to the processing circuitry 80. The second antenna unit 30 is arranged outside the SCR module 10, and spaced apart from the first antenna unit 20. In this example embodiment, the method may further include the step of intermittently switching the operation of the first antenna unit 20 and the second antenna unit 30 between transmitting signals and receiving signals.

If the two principles described in relation to FIGS. 3b and 3c are combined, the system may be operated according to the following method steps:
determining the first difference between the transmitted microwave signal ST from the first antenna unit 20 and the received reflected microwave signal SRefi R received by the first antenna unit 20 and/or a second difference between the transmitted microwave signal ST from the first antenna unit 20 and a received microwave signal SR2 received by the second antenna unit 30 and/or a third difference between the transmitted microwave signal ST3 from the second antenna unit 30 and the received microwave signal SR3 received by the first antenna unit 20,
determining a parameter indicative of the amount of the reducing agent in the SCR catalyst 12 based on the determined first difference, determined second difference and/or the determined third difference.

In the example embodiment when any one of the first antenna unit and the second antenna unit is movable along the axial direction, as described above, the system can be operated according to the following method steps:
transmitting a plurality of microwave signals, from the first antenna unit 20 and/or the second antenna unit 30, across a plurality of radial cross-sectional areas of the SCR module 10, whereby the plurality of the microwave signals are reflected within the SCR module 10,
receiving the reflected plurality of signals at a plurality of axial positions along the axial direction A, by the first antenna unit 20 and/or the second antenna unit 30,
determining a difference of each one of the received microwave signals so that a plurality of differences is determined by the processing circuitry 80, and determining a parameter indicative of the amount of the reducing agent in the SCR catalyst 12 as a function of the axial length L based on any one of the determined differences of each one of the reflected microwave signal SR.

Further, it is to be noted that any one of the example embodiments of the present invention may include a computer program comprising program code means for performing the method steps of the present invention, as described above, when the program is run on a computer.

Accordingly, any one of the example embodiments of the present invention may be provided with a computer readable medium carrying a computer program comprising program code means for performing the method steps of the present invention, as described above, when the program product is run on a computer.

Thanks to the present invention, there is provided a system and method capable of determining a parameter indicative of an amount of a reducing agent, e.g. the NH3-amount, in the SCR catalyst at a given axial distance X. Accordingly, the present invention allows for a determination of the distribution of the NH3-amount by any one of the arrangement illustrated in FIGS. 3a-3f and described above. In addition, the present invention contributes to a more precise measurement of the NH3-amount, hereinafter sometimes also called NH3 loading buffer, in the SCR module and better urea injection control.

Moreover, the present invention provides a system that is capable of determining a parameter indicative of the NH3-amount in the SCR catalyst allowing for a determination of the ammonia coverage at a given distance from the inlet (i.e. front of the SCR module) so as to better deal with problems and parameters, as mentioned above. In other words, by the present invention, it becomes possible to determine the distribution of the NH3-amount in the SCR catalyst.

By the provision that the first antenna unit is arranged outside the SCR module and configured to transmit microwave signals ST towards the SCR catalyst and to receive a microwave signal SR reflected within the SCR module, it becomes possible to provide a non-invasive system utilizing microwaves for determining a parameter indicative of the NH3-amount in the SCR module. Accordingly, the above provision means that the antenna unit is arranged outside the stream of exhaust gas. In other words, the antenna is arranged outside of the SCR module and consequently outside the stream of exhaust gas, as opposed to inside the SCR module and in the stream of exhaust gas.

It is to be understood that the present invention is not limited to the embodiments described above and illustrated in the drawings; rather, the skilled person will recognize that many changes and modifications may be made within the scope of the appended claims. For example, although the invention has been described in relation to the first antenna unit, the second antenna unit, the third antenna unit and specific combinations of specific antenna configurations, it should be readily appreciated that a use of a fourth antenna unit may be combined in other configurations as well which is clear for the skilled person when studying the present application. Further, it should be readily appreciated that the present invention may include an appropriate number of antenna units, i.e. even more than four antenna units. Accordingly, in one example embodiment (although not shown), there is provided a system including a multiple set of antenna units including any one of the arrangements, features and/or effects described above in relation to FIGS. 3a-3f.

The invention claimed is:

1. A system for determining a parameter indicative of an amount of a reducing agent in a selective catalytic reduction (SCR) module of a vehicle, the system comprising:
the SCR module having at least one passage for transporting a stream of gas and an SCR catalyst for converting NOx emissions, and having an extension in an axial direction,
a first antenna unit configured to transmit microwave signal and receive a microwave signal (SR),
wherein the first antenna unit is arranged outside the SCR module and configured to transmit microwave signals towards the SCR catalyst and to receive a microwave signal reflected within the SCR module,
wherein the system further comprises:
processing circuitry connected to the first antenna unit and configured to determine a first difference between the transmitted microwave signal and the received reflected microwave signal, and to determine a parameter indicative of the amount of a reducing agent in the SCR catalyst based on the determined first difference between the transmitted microwave signal and the received reflected microwave signal (SRef R),
wherein the first antenna unit is configured to transmit microwave signals across a cross-sectional area of the SCR module, and the SCR module is configured to transport the stream of gas parallel to the axial direction, the first antenna unit being positioned within a distance in the axial direction limited by end portions of the SCR module, and the processing circuitry being configured to determine an amount of $NH_3$ in the SCR catalyst at a plurality of axial positions along an axial length of the SCR module.

2. The system according to claim 1, wherein the reducing agent is at least one of anhydrous ammonia, aqueous ammonia or urea.

3. The system according to claim 1, wherein the reducing agent comprises at least one of anhydrous ammonia, aqueous ammonia or urea, or a mixture thereof.

4. The system according to claim 1, wherein the amount of the reducing agent correlates to an amount of NH3.

5. The system according to claim 1, wherein the first antenna unit is configured to transmit microwave signals across a cross sectional area (TA) of the SCR module.

6. The system according to claim 1, wherein the system further comprises:
a second antenna unit configured to receive the transmitted microwave signal from the first antenna unit, and connected to the processing circuitry,
wherein the second antenna unit is arranged outside the SCR module and spaced apart from the first antenna unit,
the processing circuitry is configured to determine at least one of the first difference between the transmitted microwave signal from the first antenna unit and the received reflected microwave signal received by the first antenna unit and a second difference between the transmitted microwave signal from the first antenna unit and a received microwave signal received by the second antenna unit to determine a parameter indicative of the amount of a reducing agent in the SCR catalyst based on the at least one of the determined first difference and the determined second difference.

7. The system according to claim 1, wherein the system further comprises:
a second antenna unit configured to transmit a microwave signal to the first antenna unit, and connected to the processing circuitry,
wherein the second antenna unit is arranged outside the SCR module and spaced apart from the first antenna unit,
the processing circuitry is configured to determine at least one of the first difference between the transmitted microwave signal from the first antenna unit and the received reflected microwave signal received by the first antenna unit and a third difference between the transmitted microwave signal from the second antenna unit and the received microwave signal (SR3) received by the first antenna unit to determine a parameter indicative of the amount of a reducing agent in the SCR catalyst based on the at least one of the determined first difference and the determined third difference.

8. The system according to claim 6, wherein the first antenna unit and the second antenna unit are arranged on the same axial distance, as seen in the axial direction.

9. The system according to claim 6, wherein the first antenna unit is arranged spaced apart from the second antenna unit, as seen in the axial direction.

10. The system according to claim 1, wherein at least one of the position of the first antenna unit and the position of the second antenna unit is movable along the axial direction.

11. The system according to claim 6, wherein the system further comprises a third antenna unit configured to transmit and receive a microwave signal, the third antenna unit is connected to the processing circuitry and arranged outside the SCR module, and spaced apart from the first antenna unit and second antenna unit,
wherein the first antenna unit, the second antenna unit and the third antenna unit are configured to transmit and receive signals intermittently between each other.

12. The system according to claim 11, wherein the processing circuitry is configured to:
determine at least any one of the first difference, the second difference, the third difference, a fourth difference between the transmitted microwave signal from the first antenna unit and the received microwave signal (SR5) received by the third antenna unit, and a fifth difference between the transmitted microwave signal (ST4) from the third antenna unit and the received microwave signal (SR4) received by the first antenna unit, and determine a parameter indicative of the amount of the reducing agent in the SCR catalyst based on the at least any one of the determined first difference, second difference, third difference, fourth difference and fifth difference.

13. The system according to any one of claim 11, wherein the first antenna unit, the second antenna unit and the third antenna unit are arranged on the same axial distance, as seen in the axial direction.

14. The system according to any one of claim 11, wherein the first antenna unit, the second antenna unit and the third antenna unit are spaced apart from each other, as seen in the axial direction.

15. The system according to claim 1, wherein the system further comprises a casing surrounding the SCR module and that any one of the antenna units is positioned outside the casing.

16. The system according to claim 1, wherein at least one of the microwave signal transmitted from any one of the first antenna unit, the second antenna unit and the third antenna unit is within a bandwidth having a pre-determined radio frequency.

17. The system according to claim 1, wherein the SCR module is a honeycomb structure.

18. The system according to claim 17, wherein the SCR catalyst is coated onto a wall surface of the honeycomb structure.

19. The system according to claim 17, wherein the SCR catalyst is a part of the honeycomb structure.

20. The system according to claim 1, wherein the SCR catalyst is a zeolite-based catalyst or vanadia-based catalyst.

21. An exhaust aftertreatment system for receiving an exhaust gas, the exhaust aftertreatment system comprising the system according to claim 1 and further comprising an injector for supplying a reducing agent to the exhaust gas at a position upstream of the SCR module.

22. The exhaust aftertreatment system according to claim 21, further comprising a diesel particulate filter arranged upstream of the injector, and a diesel oxygen catalyst arranged upstream of the diesel particulate filter.

23. An internal combustion engine producing an exhaust gas, and operatively connected to an exhaust aftertreatment system according to claim 21.

24. A method for determining a parameter indicative of an amount of a reducing agent in a system of a vehicle, wherein the system includes a selective catalytic reduction (SCR) module, a first antenna unit configured to transmit and receive a microwave signal, wherein the first antenna unit is arranged outside the SCR module and configured to transmit microwave signals towards the SCR module and to receive a microwave signal reflected within the SCR module, and a processing circuitry connected to the first antenna unit, wherein the SCR module having at least one passage for transporting a stream of gas and an SCR catalyst for converting NOx emissions, and having an extension in an axial direction, wherein the first antenna unit is configured to transmit microwave signals across a cross-sectional area of the SCR module, and the SCR module is configured to transport the stream of gas parallel to the axial direction, the first antenna unit being positioned within a distance in the axial direction limited by end portions of the SCR module, wherein the method includes the steps of:
transmitting a microwave signal from the first antenna unit and towards the SCR catalyst, whereby the microwave signal is reflected within the SCR module,
receiving the reflected microwave signal by the first antenna unit,
determining a first difference between the transmitted microwave signal and the received reflected microwave signal by the processing circuitry, and
determining a parameter indicative of the amount of a reducing agent in the SCR catalyst based on the determined first difference between the transmitted microwave signal and the received reflected microwave signal including at least determining an amount of $NH_3$ in the SCR catalyst at a plurality of axial positions along an axial length of the SCR module.

25. The method according to claim 24, further including the step of controlling a supply of a reducing agent to the exhaust gas at a position upstream of the SCR module.

26. The method according to claim 24, wherein the system further includes a second antenna unit configured to transmit and receive a microwave signal and connected to the processing circuitry, wherein the second antenna unit is arranged outside the SCR module, and spaced apart from the first antenna unit, wherein the method further includes the step of intermittently switching the operation of the first antenna unit and the second antenna unit between transmitting signals and receiving signals.

27. The method according to claim 26, further including the steps of:
determining at least one of the first difference between the transmitted microwave signal from the first antenna unit and the received reflected microwave signal received by the first antenna unit, a second difference between the transmitted microwave signal from the first antenna unit and a received microwave signal received by the second antenna unit, and a third difference between a transmitted microwave signal from the second antenna unit and a received microwave signal (SR3) received by the first antenna unit, and determining a parameter indicative of the amount of the reducing agent in the SCR catalyst based on the at least one determined first difference, the determined second difference and the determined third difference.

28. The method according to claim 26, further including the steps of:—transmitting a plurality of microwave signals, from at least one of the first antenna unit and the second antenna unit, across a plurality of radial cross-sectional areas of the SCR module, whereby the plurality of the microwave signals are reflected within the SCR module, receiving the reflected plurality of signals at a plurality of axial positions along the axial direction, by at least one of the first antenna unit and the second antenna unit, determining a difference of each one of the received microwave signals so that a plurality of differences is determined by the processing circuitry, and determining a parameter indicative of the amount of the reducing agent in the SCR catalyst as a function of the axial length (L) based on any one of the determined differences of each one of the reflected microwave signal (SR).

29. A system comprising a processor including a program for performing the steps of claim 24 when the program is run on the processor.

30. A non-transitory computer readable medium carrying a computer program for performing the steps of claim 24 when the program is run on a computer.

* * * * *